US012772358B2

(12) United States Patent
Kretschmann et al.

(10) Patent No.: US 12,772,358 B2
(45) Date of Patent: Oct. 20, 2026

(54) ILLUMINATION DEVICE AND ILLUMINATION PROCESS WITH AUTOMATIC SHADING COMPENSATION

(71) Applicant: Drägerwerk AG & Co. KGaA, Lübeck (DE)

(72) Inventors: Hanno Kretschmann, Lübeck (DE); Georg Spielberger, Lübeck (DE); Peter Tanler, Lübeck (DE)

(73) Assignee: DRÄGERWERK AG & CO. KGAA, Lübeck (DE)

( * ) Notice: Subject to any disclaimer, the term of this patent is extended or adjusted under 35 U.S.C. 154(b) by 81 days.

(21) Appl. No.: 18/623,254

(22) Filed: Apr. 1, 2024

(65) Prior Publication Data

US 2024/0341021 A1 Oct. 10, 2024

(30) Foreign Application Priority Data

Apr. 5, 2023 (DE) ..................... 10 2023 108 682.0

(51) Int. Cl.

| | |
|---|---|
| ***H05B 47/11*** | (2020.01) |
| ***H05B 47/115*** | (2020.01) |
| ***H05B 47/155*** | (2020.01) |

(52) U.S. Cl.

CPC ........... *H05B 47/11* (2020.01); *H05B 47/155* (2020.01)

(58) Field of Classification Search

CPC .... H05B 47/11; H05B 47/155; H05B 47/115; A61B 2017/00221; A61B 90/30; F21V 23/0471; F21V 19/00; F21V 1/08; F21V 14/00; F21W 2131/205; G01B 21/02

See application file for complete search history.

(56) References Cited

U.S. PATENT DOCUMENTS

| | | | | |
|---|---|---|---|---|
| 10,772,702 | B2 * | 9/2020 | Petrucci | A61B 90/30 |
| 2017/0318644 | A1 * | 11/2017 | Hartl | H05B 47/115 |
| 2019/0098729 | A1 * | 3/2019 | Broers | H05B 47/11 |
| 2024/0080952 | A1 * | 3/2024 | Kretschmann | A61B 90/30 |

FOREIGN PATENT DOCUMENTS

| | | | |
|---|---|---|---|
| DE | 60300647 | T2 | 2/2006 |
| DE | 102014222794 | A1 | 5/2016 |
| DE | 102015225978 | A1 | 3/2017 |
| JP | 2004207237 | A | 7/2004 |

* cited by examiner

*Primary Examiner* — Minh Tran

(74) *Attorney, Agent, or Firm* — McGlew and Tuttle, P.C.

(57) ABSTRACT

An illumination device (100) and an illumination process are capable of illuminating a surface. A control unit (10) captures an illuminance specification and controls the light sources (a.1, b.1, c.1) of the illumination device in such a way that the maximum illuminance achieved on the surface is equal to the illuminance specification. Each light source can be controlled independently of any other light source. Several distance meters (dm, dm.2, . . . , dm.6) measure the respective distance between themselves and the illuminated surface. The control unit detects the event that an object (AO) is shading an area of the surface and causes this shading to be at least partially compensated. For this purpose, the control unit increases the maximum illuminance of unshaded light sources. Preferably, the maximum illuminance of light sources that are redundant or partially redundant to shaded light sources and are not themselves shaded is increased.

16 Claims, 13 Drawing Sheets

ILLUMINATION DEVICE AND ILLUMINATION PROCESS WITH AUTOMATIC SHADING COMPENSATION

CROSS REFERENCE TO RELATED APPLICATIONS

This application claims the benefit of priority under 35 U.S.C. § 119 of German Application 10 2023 108 682.0, filed Apr. 5, 2023, the entire contents of which are incorporated herein by reference.

TECHNICAL FIELD

The invention relates to an illumination device (lighting device) and an illumination process (lighting process) with automatic compensation of a change in brightness, wherein the change in brightness is caused by shading (shadowing). The shading is caused by an object in the space between the illumination device and a surface illuminated by the illumination device.

BACKGROUND

Such an illumination device is used, for example, to illuminate an operating table and thus a patient lying on this operating table. It is possible that a part of the body of a person treating the patient, or an instrument used by this person may come between the illumination device and the patient on the operating table, causing the illuminated patient to be shaded. If the shading is not detected or is detected but not sufficiently compensated for, this can result in an area of the patient no longer being sufficiently brightly illuminated.

As a rule, the illumination device comprises several light sources that are directed at the operating table. As a rule, the object between the illumination device and the operating table therefore does not cause a complete shadow ("cast shadow"), but merely causes that individual areas of the illuminated surface, i.e. the patient, are illuminated less strongly than desired. This should also be understood under the term "shading".

SUMMARY

It is an object of the invention to provide an illumination device and an illumination process which are better able to automatically compensate for shading by a part of a person's body and/or by an object than known illumination devices and illumination processes.

The object is attained by an illumination device with features disclosed herein and by an illumination process with features disclosed herein. Advantageous embodiments of the invention are disclosed herein. Advantageous embodiments of the illumination device according to the invention are, where appropriate, also advantageous embodiments of the lighting process according to the invention and vice versa.

The illumination device according to the invention and the illumination process according to the invention are capable of illuminating a surface. The surface is, for example, an operating table or a patient lying on the operating table.

In the following, some terms are first defined which relate to an illumination device and are subsequently used for the description of the invention.

The illumination device according to the invention and many illumination devices for medical purposes known from the prior art comprise several individual light sources. The term "lighting unit" is used below. The term "lighting unit" is a generic term for the entire illumination device as well as for each individual light source and for a group of light sources.

The "illuminance" (Ev) of a lighting unit describes the luminous flux per unit area, whereby the luminous flux emanates from the lighting unit and strikes a surface. The SI unit is lux=lumen/m^2. In a plane that is perpendicular to the optical center axis of the lighting unit, the illuminance of the lighting unit typically assumes the maximum value at the intersection of the optical center axis with this plane. Particularly in the case of a lighting unit with several individual light sources, it is possible that the maximum illuminance value is assumed to be outside the intersection point, for example on a circle around the intersection point. Because the maximum illuminance usually depends on the distance between the lighting unit and the illuminated object, the maximum illuminance is often related to a specified reference distance. In medical applications, this is often 1 m.

To distinguish between the illuminance produced by the lighting device as a whole, the term "entire illuminance (total illuminance)" is used, and the illuminance produced by a single light source is referred to as 'individual illuminance'. The terms "maximum entire illuminance" of the illumination device and "maximum individual illuminance" of an individual light source are used accordingly. The (local) illuminance and the maximum illuminance are changeable variables (changeable quantities) that assume a value at any one time. The maximum achievable individual illuminance of a light source, on the other hand, is a value that is predetermined by the configuration of the light source and only gradually decreases—if at all—due to ageing. The maximum individual illuminance is between zero and the maximum achievable individual illuminance (inclusive).

A lighting unit has an optical center axis and generates a light field on an illuminated surface. This light field has an illuminance that varies across the illuminated surface and reaches a maximum at one point or in one area of the surface. This area is referred to below as the "maximum area". The maximum area can be a single point or an idealized circular ring, whereby this circular ring preferably has the intersection point between the optical axis and the illuminated surface as its center.

The light field of a lighting unit can be described by a three-dimensional representation, whereby the illuminated surface assumed to be a plane extends in the x-y plane of this representation and the illuminance which the lighting unit achieves at a point (x, y) on the surface is plotted on the z-axis. In many cases, the light field of a lighting unit has the idealized shape of a bell curve. This bell curve reaches its maximum at the intersection of the optical center axis with the illuminated surface.

If the illuminated surface is flat and perpendicular to the optical center axis of the lighting unit, the area on the surface in which the illuminance averaged over the area is x % of the maximum illuminance is typically a circle. The average illuminance in this area with x % illuminance is preferably an average value over the respective illuminance in several points on this circle, in particular in at least four points evenly distributed on the circle. The IEC 60601-2-41 standard for surgical lights (operating lights/surgical luminaires) defines eight points evenly distributed over a circle. The diameter of this circle is often also referred to as the light field diameter $d_x$ and depends on the distance between the lighting unit and the illuminated surface. The light field diameter $d_x$ is therefore often related to the specified reference distance between the lighting unit and the illuminated surface, for example a reference distance of 1 m. In a medical lighting unit, x=10%, sometimes also x=50%, and the light field diameter is the diameter at which the illuminance is one tenth or half of the maximum illuminance on the illuminated surface Ob. In a lighting unit for an operating table, $d_{10}$ is typically between 13 cm and 35 cm. In many embodiments, a user can specify a desired value for $d_{10}$.

The circle defined above, which has the light field diameter $d_x$, is also referred to below as the "$d_x$ circle". The center of the $d_x$ circle is the intersection between the optical center axis and the illuminated surface. The area on the surface that is surrounded by the $d_x$ circle and has the shape of a full circle is referred to below as the "$d_x$ area".

The illumination device according to the invention and the illumination process according to the invention are capable of illuminating a surface. The surface is, for example, a medical operating table and the surface of a patient lying on the operating table facing the illumination device. The illumination process according to the invention is carried out using the illumination device according to the invention.

The illumination device according to the invention has an optical center axis and comprises a light source set with several light sources. Preferably, the set of light sources comprises at least 10 light sources, particularly preferably at least 30 light sources, in particular at least 60 light sources. It is possible that the illumination device comprises at least one further light source which does not belong to the set of light sources and therefore does not necessarily have all the properties which the light sources of the set of light sources have according to the invention or preferably and which are described below.

The light sources of the light source set can be controlled externally and can all be of the same configuration. It is also possible that at least two light sources of the light source set differ from each other.

Each light source in the light source set has an optical light axis. The optical light axes of two different light sources do not coincide because the two light sources are at a distance from each other. Each light source is capable of generating a light field on the illuminated surface. Preferably, the light field of a light source is rotationally symmetrical to the optical light axis of this light source. One property specified by the configuration of the light source is the maximum achievable individual illuminance of the generated light field, which preferably relates to the reference distance. It is possible that all light sources in the light source set have the same maximum achievable individual illuminance. It is also possible that at least two light sources of the light source set differ from each other in terms of their maximum achievable individual illuminance.

At any given time, the maximum individual illuminance of a light source assumes a value that lies between zero and the maximum achievable individual illuminance of this light source (inclusive). The current value of the maximum individual illuminance of a light source in the light source set can be set and changed by external control, independently of any other light source in the light source set and therefore also independently of the current value of the maximum individual illuminance of any other light source.

As mentioned above, the illumination device achieves maximum entire illuminance in a maximum area. In many cases, the maximum area is rotationally symmetrical to the intersection of the optical center axis of the illumination device with the illuminated surface. As a rule, the maximum area moves (travels) across the illuminated surface when the illumination device is moved laterally or at an angle relative to the illuminated surface. The maximum entire illuminance achieved by the illumination device on the surface and where the maximum area is located relative to the optical center axis depends on the one hand on the respective maximum individual illuminance of each light source and on the other hand on the respective orientation of the light axis of the light source relative to the optical center axis.

Furthermore, the illumination device comprises a distance measuring arrangement. The distance measuring arrangement comprises several, i.e. at least two, distance meters (distance sensors) that are spaced apart from one another. Each distance meter of the distance measuring arrangement has a measuring direction which points towards the illuminated surface. Each distance meter is capable of measuring a distance in the measuring direction between itself and a light-scattering object. This light-scattering object can be the illuminated surface or an object on the surface or also a shading (shadowing) object, i.e. an object that comes into the area between the illumination device and the illuminated surface and is at a distance from the illuminated surface.

The illumination device also comprises a signal-processing control unit (controller/electronic control unit). The control unit can be integrated into a light source carrier (support) of the illumination device or be spatially separated from such a carrier. Between the control unit and each light source of the light source set there is a permanent or at least temporary data connection from the control unit to the light source, which can be realized by cable and/or by electromagnetic radio waves. A further data connection leads from the distance measuring arrangement to the control unit that is permanent or at least intermittent.

This control unit is able to receive and automatically process a signal from the distance measuring arrangement as well as specifications. Such a specification can come from a user or from a higher-level control or regulation system. According to the invention, the control unit is able to capture (acquire/record) an illuminance specification (lighting specification) as a specification. This illuminance specification specifies a target value for the maximum total illuminance, whereby the illumination device should achieve a maximum total illuminance with this value. Preferably, the illuminance specification relates to the reference distance.

Depending on this processing, the control unit is able to control the light sources of the light source set, and each light source independent of every other light source. In addition, the control unit is able to capture predetermined (predefined) information for each light source in the light source set. This information can be stored in a data memory to which the control unit has at least temporary read access. This information can also be specified as parameters of a stored program, whereby the control unit executes this program when the surface is illuminated. As a rule, this program is stored in a data memory of the control unit and runs on a processor of the control unit. It is also possible that part of the information is stored in the data memory and another part is specified as a parameter of the program.

The information about a light source of the light source set includes, on the one hand, a value of the maximum individual illuminance that this light source is capable of generating, i.e. a maximum achievable individual illuminance specified by the configuration. Preferably, this maximum achievable individual illuminance relates to the above-mentioned reference distance. The value corresponds, for example, to the maximum electrical voltage that can be applied to the light source, or the maximum electrical current or maximum electrical power for the light source.

On the other hand, the information for each light source of the light source set includes information on how the optical light axis of this light source is positioned and oriented relative to the optical center axis of the illumination device. The light axis of a light source can coincide with the optical center axis of the illumination device or be parallel to the optical center axis at a distance or intersect the optical center axis or also be arranged at an angle to the optical center axis. Two straight lines in space are at an angle to each other if they neither coincide nor are parallel to each other nor intersect. The information captured by the control unit determines in particular how the light axes of the light sources are positioned relative to each other.

The control unit is able to control each light source of the light source set individually, i.e. independently of any other light source of the light source set. Through appropriate control, the control unit is able to set the respective maximum individual illuminance of a light source to a value that lies between zero and the maximum achievable individual illuminance of this light source (inclusive). In one implementation, the control unit is able to continuously change the maximum illuminance achieved, while in another implementation the control can be stepped. Thanks to this control, the respective maximum individual illuminance of a light source of the light source set can be changed independently of any other light source. Note: Of course, the maximum individual illuminance of a light source cannot usually be set exactly to a desired value, but only with a certain error.

Note: It is possible that at least two individual light sources of the illumination device are combined to form a light source module and that the individual light sources of a light source module can only be controlled together. In this case, the term “light source of the light source set” refers to such a light source module with at least two individual light sources. In this case, the illumination device according to the invention comprises at least two such light source modules. The light source module is, for example, an assembly with at least two individual light sources, whereby this assembly can be replaced separately from the rest of the illumination device.

According to the invention, the control unit is able to receive and process a signal from the distance measuring arrangement. This processing enables the control unit to automatically check (determine) whether a shading event has occurred and/or is currently present, and in particular to detect a shading event. A “shading event” is understood to be the following event: At least one object is currently located between the illumination device—more precisely: between at least one light source of the light source set—and the illuminated surface. By processing the signal of the distance measuring arrangement, the control unit is able to detect a shading object at least when this object changes the respective distance measured by the distance meter or at least one distance meter of the distance measuring arrangement. As a rule, the object causes at least one light source of the light source set to be completely or at least partially obscured and changes at least one measured distance. This is why the term “the shading object” is used in the following. This term can also refer to several objects, for example a part of the body of a treating physician and an instrument used by the physician. As a rule, the position of the shading object varies relative to the illumination device, and thus the shading varies over time.

Without a countermeasure, the shading caused by the shading object changes the light field that the illumination device generates on the illuminated surface. Shading compensation” refers to a measure that the control unit triggers automatically with the objective of at least partially compensating for the shading. Ideally, the light field that the illumination device generates on the illuminated surface remains unchanged thanks to shading compensation. In practice, this objective can usually only be approximately achieved.

According to the invention, this objective is realized as follows: The primary objective of shading compensation is that both the maximum entire illuminance achieved by the illumination device and the position of the maximum area relative to the optical center axis of the illumination device remain unchanged and therefore, despite the shading, the maximum entire illuminance achieved is equal to an illuminance specification. The maximum area should maintain its position relative to the optical center axis. In other words, the position of the maximum area relative to the optical center axis should not be changed by the shading event. In the case of a medical illumination device, there is often an area of a patient’s body around this maximum area on which surgery is performed.

An optional further objective is that the entire light field diameter achieved by the illumination device also remains unchanged. It is also possible that the $d_x$ circle should not change its position relative to the optical center axis. An optional third objective is that the correlated entire color temperature of the illumination device also remains unchanged. Depending on the extent of the shading, these objectives can be fully or only partially achieved. It is possible that the control unit automatically attempts to achieve these three objectives in descending order of priority. It is also possible for the control unit to achieve a compromise between at least two of these objectives.

Put simply, the shading compensation measure or each shading compensation measure comprises the step of increasing the maximum individual illuminance of at least one unshaded light source. Although possible in principle, it is not necessary thanks to the invention that the light field diameter and/or the correlated color temperature of an individual light source can be changed. The invention also does not generally require an actuator to be able to move a light source relative to a carrier (support) of the illumination device and thus relative to another light source. Rather, all light sources can be rigidly mounted in the carrier and can only be moved together with the carrier. Dispensing with an actuator saves space in the carrier and eliminates the need to control an actuator.

The control unit is also configured as follows: If a shading event, i.e. a shading object, is detected, the control unit determines at least approximately an area on the illuminated surface that is completely or at least partially shaded by the object between the illumination device and the illuminated surface. As a rule, a shaded object does not produce a cast shadow (hard shadow) because the illumination device comprises several light sources. “At least partially shaded” means: In this area, the illuminance after shading deviates downwards from the illuminance before shading by more than a predetermined threshold. For example, the shading reduces the illuminance by at least 30% or even at least 50%.

To determine the shaded area, the control unit uses the specified and captured information for each light source as to how the light axis of this light source is oriented and/or positioned relative to the optical center axis of the illumination device. The control unit also uses the signal from the distance measuring arrangement. Preferably, when determining the shaded area, the control unit uses the two simplifying assumptions that the illuminated surface is perpendicular to the optical center axis of the illumination device and that the distance to the illumination device is equal to the reference distance. In many cases, the deviations between reality and these two assumptions are practically insignificant.

Preferably, the control unit determines the contour of the shading object in a plane that is perpendicular to the optical center axis of the illumination device. To determine the shading area, the control unit uses the determined contour and the distance along the optical center axis between the illumination device and the illuminated surface as well as the distance between the illumination device and the shading object and/or between the shading object and the illuminated surface.

The control unit searches for at least one light source of the light source set that is suitable for shading compensation—more precisely: is currently suitable for at least partially compensating for the detected shading, usually together with at least one other light source of the light source set. For this search, the control unit uses information about the detected shaded area of the illuminated surface. Preferably, the control unit determines at least one light source of the light source set with the following property: The respective light axis of the determined light source or each determined light source intersects the surface in the shaded area.

According to the invention, a light source is suitable for shading compensation if the following conditions have occurred cumulatively, whereby it can be automatically determined whether these conditions are fulfilled or not:

- The light source is currently not shaded at all, or at least not completely.
- The light axis of the light source intersects the illuminated surface in the determined shading area.
- The light source is currently being operated with a value for its maximum individual illuminance that is lower than the maximum achievable individual illuminance of this light source. The light source can also currently be switched off. Therefore, the current value of the maximum individual illuminance of this light source can be increased.

An embodiment was described above in which the control unit determines the contour of the shading object in a plane that is perpendicular to the optical center axis. In one embodiment, the light source is not or at least not completely obscured if the light axis of the light source does not run through the determined contour, but is at a distance from the contour.

The control unit uses the signal from the distance measuring arrangement and the information about the light sources described above to search for a suitable light source. As a rule, it depends on at least one dimension of the shading object and the position of the object relative to the illumination device and/or the illuminated surface which light sources are currently shaded and which are not. In particular, which light sources are suitable and which are not depends on the contour of the shading object in a plane that is perpendicular to the optical center axis and on the distance between the shading object and the illuminated surface.

It is possible that the control unit does not find a suitable light source. This is particularly the case if all unshaded light sources are already being operated at the maximum achievable individual illuminance.

The control unit is also configured as follows: If it has found at least one suitable light source, it determines a subset of the set of light sources, this subset comprising at least one light source and consisting only of light sources that are currently suitable for shading compensation. The subset can consist of all currently suitable light sources or of some of the suitable light sources. It can also consist of only a single suitable light source, even if there are several suitable light sources. Advantageous embodiments specify different ways of implementing how this subset can be determined.

The control unit is able to cause the respective maximum individual illuminance of the light source or each light source of the determined subset to be increased. For this purpose, the control unit is able to calculate or otherwise determine a target value for each light source of the determined subset. This target determines the maximum individual illuminance to be achieved for this light source. The calculated target for a suitable light source is greater than the current value of the maximum individual illuminance and in one embodiment is equal to the specified maximum achievable individual illuminance of this light source, in another embodiment is less than the maximum achievable individual illuminance. The control unit determines the maximum achievable individual illuminance from the information about the light sources described above.

To determine the subset and calculate the respective target value for the maximum individual illuminance, the control unit uses the detected information about the light sources of the light source set and optionally the signal from the distance measuring arrangement. The control unit performs the calculation of the target values for the light sources of the subset with the objective of ensuring that the actual value of the maximum total illuminance currently achieved by the illumination device is equal to the captured illuminance specification.

The control unit controls the light source or each light source of the determined subset with the objective of ensuring that the actual value of the maximum individual illuminance currently achieved by the light source is equal to the calculated target value.

The objective is therefore to control the light sources of the determined subset in such a way that the determined subset can fully or at least partially compensate for the shading. According to the invention, the control unit causes the value of the maximum individual illuminance of at least one light source, preferably each light source of the determined subset, to be increased. Of course, it is possible that the shading can only be partially compensated for, even though at least one suitable light source has been found. Two possible reasons for this are that not enough suitable light sources are found or the achievable increase in the maximum individual illuminance of the suitable light sources found is not sufficient.

The process according to the invention is carried out using an illumination device according to the invention and comprises the following steps:

- For each light source in the light source set, the control unit captures the specified information about this light source.
- The control unit captures an illuminance specification.
- The control unit sets the respective current maximum individual illuminance of each light source of the light source set to a value at least once and again if required.
- The illumination device illuminates the surface and achieves maximum total illuminance.
- The distance meter or each distance meter of the distance measuring arrangement measures an indication (dimension) for the respective distance between itself and a light-scattering object. The distance meter measures the dimension at least once, preferably several times, particularly preferably with a fixed sampling frequency.

The control unit checks (determines) whether a shading event has occurred. For this check, the control unit uses a signal from the distance measuring arrangement. The control unit performs this check at least once, preferably repeatedly, and particularly preferably with a fixed sampling frequency. The sampling frequency of the control unit can be the same as the sampling frequency of the distance measuring arrangement or can also be smaller or larger.

The detection of a shading event triggers at least the following additional steps:

The control unit searches for at least one light source of the light source set that is currently suitable for shading compensation.

If at least one light source suitable for shading compensation is found, the control unit performs the following steps:

The control unit determines a subset with at least one suitable light source. The subset can also consist of all suitable light sources.

The control unit calculates a target value for each light source in the selected subset. This target specifies the maximum individual illuminance that this light source should generate. The calculated target value is greater than the current value of the maximum individual illuminance and is less than or equal to the maximum achievable individual illuminance.

The control unit controls the light source or one, preferably each, light source of the determined subset and, through the control, effects that the controlled light source actually achieves the calculated target value for the maximum individual illuminance.

The control unit calculates the target values for the light sources of the subset with the objective of ensuring that the maximum area maintains its position relative to the optical center axis and that the maximum total illuminance assumes a value that is equal to the captured illuminance specification.

In many cases, the invention makes it possible to compensate for shading relatively well. In particular, in many cases the maximum entire illuminance is reduced relatively little and therefore the surface is still sufficiently illuminated despite the shading. In particular, the maximum area often remains sufficiently illuminated. It is often even the case that the light field which the illumination device generates on the illuminated surface only changes relatively little despite the shading thanks to the compensation according to the invention.

The invention does not require the illumination device to comprise an actuator, wherein said actuator is capable of pivoting or otherwise moving at least one light source relative to at least one other light source.

The invention can be applied to an illumination device whose light sources emit different light, for example light with different correlated color temperatures and/or different amplitudes, in order to detect shading on the basis of these differences. However, the invention does not require an illumination device with such light sources. All light sources of the illumination device can also emit light with the same amplitude.

According to the invention, the control unit determines the shading area, i.e. determines which area on the illuminated surface is shaded by the object. In order to at least approximately compensate for this shading, the control unit determines at least one light source whose light axis intersects the illuminated surface in the shading area. The maximum individual illuminance of such a light source is increased. In many cases, this feature results in the shading being better compensated for than with known processes. This effect is achieved in particular because the shading area on the surface is determined and not or not only the size of the shading object. In particular, the shading is often compensated relatively well even if not all light sources are arranged concentrically around the optical center axis. In addition, the shading is better compensated by the invention than if it were merely determined which light sources are currently not shaded. It is possible that a light source is not shaded, but its light axis intersects the illuminated surface outside the shading area. In many cases, it would not make sense to increase the maximum individual illuminance of this light source.

Preferably, the control unit also captures the information on how the respective measuring direction of each distance meter is arranged relative to the optical center axis of the illumination device. Preferably, the control unit is able to automatically determine whether and, if so, which light sources of the light source set are currently shaded. In a preferred embodiment, the control unit has detected the shading of a light source if it is detected that a light-scattering object is located in that section of the light axis of this light source which extends from the light source to the illuminated surface. In one embodiment, the control unit is able to determine which distance meters of the distance measuring arrangement have each detected a distance that is significantly smaller than the distance between the distance meter and the illuminated surface, for example outside a specified tolerance band. Of course, it is possible that there is only one such distance meter.

Preferably, the control unit is able to check repeatedly, particularly preferably with a predefined sampling frequency, whether a shading event is currently present or not. The control unit is preferably configured to carry out the shading compensation measures just described with this sampling frequency. Repeated execution means that in many cases the shading is quickly detected and at least partially compensated for. The sampling frequency is usually limited by the sampling frequency that the distance measuring arrangement is able to achieve and/or by the computing capacity of the control unit. In some cases, the time required to change the maximum individual illuminance of a light source can also be a limiting factor.

According to the invention, the control unit is able to capture an illuminance specification. In one embodiment, the control unit is additionally capable of capturing a light field diameter specification. This light field diameter specification can also originate from a user or from a higher-level control or regulation system. The light field diameter specification specifies a target value for the entire light field diameter, i.e. the light field diameter that the light field generated by the illumination device as a whole should have. This entire light field diameter also preferably refers to the above-mentioned reference distance and to an illuminated surface that is perpendicular to the optical center axis of the illumination device.

According to the invention, the control unit determines a subset of suitable light sources and calculates a target value for the maximum individual illuminance for each light source of the determined subset. According to the invention, one objective when calculating the target values is to effect that the maximum total illuminance matches the illuminance specification. According to a further embodiment described above, a further (additional) objective in the calculation of the target values is that the value of the entire light field diameter corresponds to the light field diameter specification. Thanks to this configuration, shading is therefore compensated for even better. In many cases, the light field that the illumination device achieves on the illuminated surface after compensating for the shading deviates relatively little from the light field that the illumination device generates before the shading, ideally not deviating in a way that can be perceived by a person. In many cases, the entire light field diameter also changes relatively little despite the shading because the shading compensation configuration just described is used. Of course, it is possible that the optional further objective cannot be fully achieved either.

The configuration described above with the entire light field diameter can be combined with the configuration already described to switch off light sources that are completely or at least partially shaded.

According to the invention, the control unit captures an illuminance specification and optionally a light field diameter specification. The control unit detects a shading event. In one embodiment, the control unit checks whether or not the maximum area and/or the $d_x$ range is within the shading area. If neither the maximum area nor the $d_x$ range within the circle are in the shading area, it is not necessary to compensate for the shading event in some cases.

The control unit is preferably configured to predict the entire light field diameter by calculation at least once. The entire light field generated and thus the entire light field diameter depends on the one hand on the respective current value of the maximum individual illuminance of each light source that is not switched off and on the other hand on the respective position of the light axis of the light source relative to the optical center axis of the illumination device. Preferably, the control unit uses a predefined standard value for the respective individual light field diameter of a light source. Preferably, the entire light field diameter refers to the reference distance and to a surface that is perpendicular to the optical center axis at the reference distance. The control unit calculates the target values for the maximum individual illuminances in such a way that the predicted entire light field diameter comes as close as possible to the light field diameter specification, for example by no more than a specified tolerance (predetermined tolerance).

According to the invention, the control unit searches for at least one light source that is currently suitable for shading compensation. It is possible that this search also includes light sources that are partially shaded but not completely. According to one embodiment, however, the control unit is configured in such a way that during this search it only searches among those light sources that are not shaded at all. Partially shaded light sources are therefore not taken into account during the search. In many cases, this configuration saves computing time and/or computing capacity.

Preferably, the control unit causes any light source that is completely or at least partially shaded to be switched off. In many cases, this configuration reduces energy consumption. In addition, in many cases the heating of the object being shaded is reduced when light sources that are completely or at least partially shaded are switched off. Such heating is often undesirable, especially if the object being shaded is a part of the body of a doctor providing treatment. The shaded object is at a shorter distance from the illumination device and is therefore often exposed to a greater input of thermal energy per unit area than the illuminated surface. Preferably, the control unit checks at least once, preferably repeatedly, whether this light source is still shaded. If the light source is no longer shaded, it is possible to switch the light source on again.

As a rule, every light source has a correlated color temperature. Typically, this correlated color temperature is predetermined by the configuration of the light source and cannot be changed. It is possible that all light sources in the light source set have the same correlated color temperature. In a preferred embodiment, however, the light sources of the light source set have in total at least two different correlated color temperatures. The light sources of a first subset therefore have a first correlated color temperature, while the light sources of a second subset have a second correlated color temperature that differs from the first correlated color temperature. For example, the light sources of the first subset are warm white and the light sources of the second subset are cool white. In one embodiment, the light sources of the first subset have a color temperature of 2700 Kelvin (warm white) and the light sources of the second subset have a color temperature of 6500 Kelvin (cool white). More than two different correlated color temperatures are also possible.

The illumination achieved by the illumination device as a whole has a correlated entire color temperature. This correlated entire color temperature is made up of the correlated color temperatures of the light sources that are currently switched on and not completely shaded and usually also depends on the respective maximum individual illuminance levels of these light sources.

In one embodiment, the control unit is able to capture a color temperature specification. This specification can in turn come from a user or from a higher-level control or regulation system. As just explained, the control unit calculates a maximum individual illuminance for each light source in the set of light sources. This maximum individual illuminance depends on the illuminance specification, optionally on the light field diameter specification and additionally on the optional color temperature specification. As a rule, the control unit is able to change the value of the respective maximum individual illuminance of a light source between zero and the respective maximum achievable individual illuminance, while the respective light field diameter and the respective correlated color temperature of each light source are preferably constant and cannot be changed.

As soon as the control unit has detected a shading event, the control unit determines a subset with light sources that are suitable for shading compensation in accordance with the invention and calculates or specifies a target for the maximum individual illuminance for each light source of the determined subset—of course only if at least one suitable light source is found. The primary objective when calculating these target values is to minimize the deviation between the illuminance specification and the achieved or expected value of the maximum total illuminance. Optional further objectives are, preferably in this order, that the achieved entire light field diameter deviates as little as possible from a captured light field diameter specification and that the achieved correlated entire color temperature deviates as little as possible from a captured color temperature specification.

According to the invention, the control unit is able to capture an illuminance specification, optionally also a light field diameter specification and/or a color temperature specification. The control unit is preferably configured as follows: If it has captured a specification, it calculates an initial target value for each light source in the light source set. This initial target defines the maximum individual illuminance that the light source should generate. The objective when calculating the initial target values is for the maximum total illuminance achieved to be equal to the illuminance specification and, optionally, for the entire light field diameter achieved to be equal to the light field diameter specification.

In one implementation, the control unit automatically evaluates a table ("look-up table") that specifies an initial target value to be set for several possible illuminance specifications and optionally several possible light field diameter specifications and/or color temperature specifications for each light source of the light source set. The initial target values apply to a situation without shading and remain valid at least as long as the control unit has not detected a deviating specification and has not detected a shading event. In many cases, the configuration with the table requires relatively little computing capacity and/or computing time.

The control unit is also configured as follows: When a shading event is detected and a light source suitable for shading compensation is found, the control unit performs an increasing sequence (magnification sequence, enlargement sequence) at least once. The increasing sequence or each increasing sequence comprises the following steps:

The control unit determines a subset. This subset consists of at least one light source of the light source set that is currently suitable for shading compensation. The criteria that a currently suitable light source fulfills were explained above.

The control unit calculates a target value for the light source or each light source of the determined subset. This target value defines the maximum individual illuminance that the light source should achieve. One objective when calculating the target values was explained above, namely that the maximum total illuminance achieved is equal to the illuminance specification captured. As a rule, the illuminance specification does not change as a result of the shading events. The target value or at least one target value can be the maximum achievable individual illuminance of the light source.

The control unit controls the light source or each light source of the determined subset. The control unit causes the current maximum individual illuminance of each light source to be increased to the calculated target value.

In a further embodiment of this configuration, the control unit is also configured as follows:

Each increasing sequence comprises the steps of determining a subset and calculating a target value for the maximum individual illuminance of each light source of the determined subset. According to the further embodiment, the control unit checks by calculation whether the actual value of the maximum entire illuminance of the illumination device then obtained corresponds or will correspond sufficiently precisely (within a tolerance range or relative to a threshold) to the captured illuminance specification. For this computational check, the control unit uses the respective value of the maximum individual illuminance of each unshaded light source of the light source set as well as the respective information about each unshaded light source. The control unit preferably performs a computational prediction before actually controlling suitable light sources. In this prediction, the control unit predicts the maximum entire illuminance that the illumination device will achieve with these settings.

If the computationally predicted maximum entire illuminance does not match the illuminance specification with sufficient accuracy (within a tolerance range or relative to a threshold), the control unit checks whether at least one maximum individual illuminance can be increased or further increased.

If so, the control unit preferably carries out the steps again to determine a subset and to calculate a respective maximum individual illuminance for each light source of the subset determined during the new execution. The subset that is determined during the further determination can be the same as the previously determined subset or different from it.

Alternatively, the control unit determines that the deviation between the captured illuminance specification and the current maximum entire illuminance cannot be reduced any further and therefore does not carry out a second increasing sequence.

In some cases, this step-by-step procedure requires less computing time than another possible procedure.

According to the invention, the control unit is configured as follows: If it has found at least one light source suitable for shading compensation, the control unit determines a subset with at least one suitable light source, optionally with several suitable light sources.

Preferably, the process of detecting a shading event triggers the following steps:

The control unit detects at least one light source that is completely or at least partially shaded, preferably every shaded light source.

The control unit searches for a light source that fulfills a predefined compensation criterion with regard to the shaded light source or at least one shaded light source.

Once at least one such light source has been found, the control unit checks which of the light sources found are suitable for shading compensation.

If at least one light source is found that fulfills the compensation criterion and is suitable, the control unit determines such a quantity of light sources as a subset that consists of fulfilling and suitable light sources. The control unit uses this determined subset to at least partially compensate for the shading.

Preferably, the control unit uses detectable information about the light sources to check whether a light source fulfills the predetermined compensation criterion or each predetermined compensation criterion. This detectable information is predetermined and does not depend on current operation or shading. Therefore, this information can be acquired quickly, for example by read access to a data memory. Therefore, the control unit preferably first searches for further light sources that fulfill the compensation criterion or each compensation criterion and then checks whether these further light sources are also suitable for compensating the shading, either individually or in combination.

The embodiment described above, in which at least one increasing sequence is performed, can be combined with the embodiment described above, in which at least one compensation criterion is used. Preferably, the combination comprises the following steps:

A first increasing sequence is performed. In this first increasing sequence, a search is made for light sources that fulfill the compensation criterion or each compensation criterion and are suitable for shading compensation. The subset used in the first increasing sequence consists of light sources that fulfill the compensation criterion or each compensation criterion and that are suitable for shading compensation.

It is predicted or checked whether the first increasing sequence is sufficient to compensate for the shading.

If this is not the case, a second increasing sequence is performed. This second increasing sequence searches for light sources that do not fulfill every compensation criterion, optionally do not fulfill any compensation criterion, were not used in the first increasing sequence and are also suitable for shading compensation.

It is also possible to perform more than two increasing sequences, whereby after each increasing sequence, optionally except after the last increasing sequence, it is checked whether the shading is now sufficiently compensated, and whereby in each increasing sequence weaker conditions are imposed on the light sources used than in the previous increasing sequence.

A preferred embodiment of how this subset is determined is described below. This preferred embodiment specifies the compensation criterion or a compensation criterion. Particularly preferably, in this preferred embodiment, no light source of the light source set needs to change its position and orientation relative to another light source.

According to this preferred embodiment, the illumination device comprises at least one first light source and at least one other light source that is redundant to the first light source. A light source B is redundant to a light source A, if the intersection points of the light axes of the two light sources A and B with an illuminated flat surface are spaced apart by no more than a specified tolerance and if, in addition, the light fields generated by the two light sources A and B do not deviate from each other by more than a specified tolerance.

The following definition is preferably used: Two light fields do not deviate from each other by more than a specified tolerance if, at each point of the illuminated surface, the two illuminances achieved by the two light sources at this point deviate from each other by at most this tolerance. The two intersection points and light fields refer to a situation without shading and preferably again to the above-mentioned reference distance and on a plane that is perpendicular to the optical center axis at the reference distance. At least when no light source of the illumination device can be moved relative to another light source, the configuration of the illumination device determines which light sources are more redundant to which other light sources. This redundancy does not change during use of the illumination device.

It is also possible to use only the first criterion (intersections close to each other) to determine when a light source B is redundant to a light source A. In many cases, the first criterion is fulfilled if the second criterion (almost matching light fields) is fulfilled.

According to the preferred embodiment, the following information is also stored for each light source of the light source set: Which other light source or which other light sources of the light source set are redundant to the first light source? The information as to which other light source(s) is (are) redundant to a first light source is predetermined by the configuration of the illumination device. Of course, it is possible that there is no redundant light source for a light source.

The control unit is configured as follows:

If the control unit has detected a shading event, the control unit determines at least one light source, preferably each light source of the light source set, which is currently completely or at least partially shaded. As a rule, a shading event causes at least one light source to be shaded.

The control unit searches for a light source of the light source set that is redundant to the shaded light source or a shaded light source, preferably for each such redundant light source. To do this, the control unit uses the information just described about redundant light sources.

If the control unit has found at least one such redundant light source, it checks which of the redundant light sources found are suitable for shading compensation.

It is possible that no suitable redundant light source is found. If at least one redundant and suitable light source is found, the control unit determines and uses as a subset a set of light sources consisting of at least one redundant suitable light source, preferably of all redundant suitable light sources.

The control unit causes the respective maximum individual illuminance of each redundant and suitable light source of the determined subset to be increased. The objective or at least one objective according to the invention is that the maximum total illuminance achieved is equal to the illuminance specification.

Preferably, the control unit searches for exactly one redundant suitable light source for each shaded light source. With n shaded light sources, the control unit determines up to n different redundant suitable light sources.

In many cases, the configuration with the redundant light sources leads to rapid and often even complete compensation of the shading—provided that sufficient redundant and suitable light sources are found. This is because the information as to which light sources are redundant to which other light sources is specified by the configuration, and the control unit is able to determine this information by means of read access. In addition, this configuration often requires relatively little computing capacity and therefore computing time.

In a further preferred embodiment, the illumination device comprises at least one second light source and at least one other light source which is partially redundant to the second light source. This second light source can be the first light source described above with reference to redundant light sources, or another light source. A light source B is partially redundant to a light source A if at least one of the following conditions is met:

The two intersection points of the two light axes of the two light sources are no more than the specified tolerance apart.

The intersection point of the light axis of light source B lies in the $d_x$ circle around the intersection point of the light axis of light source A and vice versa. In other words: At least when both light sources are operated with the maximum achievable individual illuminance and there is no shading, the following applies: At the intersection point of the light axis of light source B with the illuminated surface, light source A achieves an individual illuminance that is at least x % of the maximum achievable individual illuminance of light source A, and vice versa.

The light fields generated by these two light sources A and B deviate from each other by more than the specified tolerance.

In one implementation, two light sources are always partially redundant to each other if they are redundant to each other. In another form of implementation, two light sources are only partially redundant to each other if the above criteria are met and if the light sources are not redundant to each other. It is also possible to use only the embodiment with the redundant light sources or only the embodiment with the partially redundant light sources.

According to the configuration with the partially redundant light sources, the other light sources that are partially redundant to this light source are also stored for each light source in the light source set. The control unit is configured to search for a further light source for each shaded light source that is partially redundant to the shaded light source and suitable for shading compensation. The further steps correspond to those just described with reference to redundant light sources.

The information about partially redundant shading is also provided by the configuration of the illumination device, and the control unit can determine this information by means of read access. The configuration with the redundant and/or partially redundant light sources restricts the search space when searching for light sources that are currently suitable for shading compensation. In many cases, the control unit therefore needs to perform fewer calculations, which saves computing time and therefore in many cases leads to faster compensation of the detected shading compared to an embodiment in which the search space consists of all unshaded light sources in the set of light sources.

The configuration with the redundant light sources and the configuration with the partially redundant light sources can be combined with each other in various ways. In one implementation, the control unit searches for both redundant and partially redundant light sources that are suitable for shading compensation for each shaded light source in a single step and uses the set of all suitable redundant and partially redundant light sources as a subset.

The deviating implementation of a combination described below, on the other hand, specifies a step-by-step procedure. The set of light sources of the illumination device is configured as follows according to this deviating implementation: For at least one first light source there is at least one redundant light source, and for at least one second light source there is at least one partially redundant light source. The control unit is capable of performing a first increasing sequence and, if required, a second increasing sequence. In the first increasing sequence, the control unit attempts to compensate for the shading with the aid of at least one redundant and/or partially redundant light source. The light source or each light source used in the first increasing sequence also fulfills at least one predefined additional criterion. After the first increasing sequence, the control unit determines or calculates the maximum total illuminance that the illumination device now achieves or will achieve and compares this with the captured illuminance specification.

If the current maximum total illuminance deviates from the captured illuminance specification by more than a specified tolerance, the control unit performs a subsequent second increasing sequence. During the second increasing sequence, the control unit attempts to additionally compensate for the shading with the aid of at least one redundant and/or partially redundant light source. The light source or each light source used in the second increasing sequence does not fulfill the or each specified additional criterion. In many cases, the implementation of the second increasing sequence means that the shading can be compensated for relatively well, but an illuminance specification and/or an optional light field diameter specification can be met less well.

According to the implementation just described, a first increasing sequence is performed in which a search is made for redundant and/or partially redundant light sources that also fulfill the specified additional criterion or each specified additional criterion. The additional criterion or each additional criterion further restricts the search space. If the first increasing sequence alone does not lead to sufficient compensation of the shading, a subsequent second increasing sequence is carried out, in which a search is also made for redundant and/or partially redundant light sources, but no or at least not every specified additional criterion is used. The light sources found in the second increasing sequence therefore do not necessarily have to fulfill the additional criterion or each additional criterion.

Different implementations are possible as to how the additional criterion or an additional criterion for the first increasing sequence can be configured.

In one embodiment, the additional criterion or an additional criterion for the first increasing sequence is that the further light source is redundant to the first light source. The first increasing sequence therefore only searches for those light sources in the set of light sources that are redundant to at least one shaded light source. Partially redundant light sources are not taken into account in the first increasing sequence, but preferably in the second increasing sequence. In other words: In the first increasing sequence, only redundant light sources are searched for; in the second increasing sequence, partially redundant light sources are searched for, namely those that have not already been found in the first increasing sequence, i.e. generally partially redundant but not redundant light sources. As a rule, the shading of a light source can be compensated for particularly well by another light source that is not switched off and is redundant to the shaded light source. In some cases, however, redundant light sources that are not switched off are not sufficient to adequately compensate for the shading.

Three criteria were listed above for when a light source B is partially redundant to a light source A. In one implementation, the control unit searches in one step for every light source that is suitable for shading compensation and fulfills at least one of these three criteria. Preferably, this search is limited to those suitable light sources that are not redundant to a switched-off light source and are therefore not already found during the first increasing sequence. In another embodiment, a descending order among these criteria is specified. First, the control unit searches for the suitable light sources that fulfill the highest rated criterion for partial redundancy, then for the suitable light sources that fulfill the second highest criterion, and so on.

According to the invention, the primary objective is that, by compensating for the shading, the value of the maximum entire illuminance that the illumination device currently achieves is close to, ideally equal to, the captured illuminance specification. An optional further objective is that a light field diameter specification is also maintained, and an optional third objective is that a color temperature specification is also maintained. The light field diameter specification specifies a light field diameter, the color temperature specification specifies a correlated color temperature that the illumination device should achieve.

It is possible that the primary objective and/or an optional further objective cannot be achieved with the aid of suitable redundant and partially redundant suitable light sources alone. In one embodiment, the deviation is accepted. In another embodiment, the control unit searches in this situation for further suitable light sources, i.e. for light sources that are suitable for shading compensation and are neither redundant nor partially redundant to the shaded light sources.

As already explained, the predetermined compensation criterion or at least one predetermined compensation criterion is that a further light source is redundant and/or partially redundant to a shaded light source. A further embodiment of the compensation criterion or a compensation criterion is possible, whereby this further embodiment relates to light source groups. The compensation criterion with redundant and/or partially redundant light sources can be combined with the compensation criterion with the light source groups.

According to the embodiment with the light source groups, the light sources of the light source set are divided into at least two light source groups. Each light source of the light source group belongs to one and only one light source group.

The light sources of a light source group have the following property: The light sources of the light source group together generate a light field with a maximum illuminance on the illuminated surface. In one alternative, this maximum illuminance occurs at the intersection of the optical center axis of the illumination device with the illuminated surface. In another alternative, this maximum illuminance occurs in a circle around this intersection point. This property applies at least when the illuminated surface is perpendicular to the optical center axis at the reference distance, all light sources of the light source group are operated with the same maximum individual illuminance and no shading event has occurred.

The compensation criterion or a compensation criterion is the following: The further light source and the shaded light source or a shaded light source belong to the same light source group. In many cases, this embodiment leads to, or at least enables in many cases, the light field diameter achieved by the illumination device as a whole on the illuminated surface to remain approximately the same despite the shading.

Other or additional compensation criteria are possible. Another possible compensation criterion is the correlated color temperature. As a rule, each light source of an illumination device has a correlated color temperature. Preferably, the light sources of the light source set have at least two different correlated color temperatures, for example cool white and warm white. The entire correlated color temperature of the illumination device is achieved by superimposing the correlated color temperatures of the switched-on light sources. A possible further compensation criterion is that the other light source has the same correlated color temperature as the shaded light source. In many cases, this further compensation criterion means that the color temperature of the illumination device changes relatively little despite the shading.

A possible further compensation criterion is that the other light source is currently operated with a relatively low maximum individual illuminance, for example with at most half or even only a quarter of the maximum achievable individual illuminance. If the maximum individual illuminance of this light source is increased, this increase often makes a particularly large contribution to compensating for the shading.

According to the invention, the illumination device comprises a distance measuring arrangement. The control unit determines a shading area, which is an area on the illuminated surface that is shaded by the object between the illumination device and the illuminated surface. By "shading" it is meant that the maximum total illuminance on the surface in the shading area is reduced by at least one predetermined absolute or relative threshold as a result of the shading. The control unit is able to receive and evaluate a signal from the distance measuring arrangement for this purpose. Preferably, the control unit determines the contour of the shading object in a plane that is perpendicular to the optical center axis, as well as the distance between the illumination device and the contour and/or the contour and the illuminated surface. In one embodiment, the control unit is able to measure a topological profile of an area between the light source set and the illuminated surface. To measure the topological profile, the control unit uses a signal from the distance measuring arrangement. If there is no shading object in the area between the illumination device and the illuminated surface, this profile is equal to the profile of the illuminated surface and includes, for example, the profile of an illuminated patient on an operating table as the illuminated surface. A shading object changes this topological profile. The control unit is able to evaluate this determined topological profile, preferably with the above-mentioned sampling frequency. The control unit is able to detect a shading event depending on the evaluation of the topological profile. In many cases, a shading object changes the topological profile abruptly, and the control unit detects an abrupt change. Preferably, the control unit also uses the topological profile to determine the shading area on the illuminated surface.

According to the invention, the control unit captures and uses information about the light sources of the light source set, in particular the respective maximum achievable individual illuminance and the position and/or orientation of the light axis relative to the optical center axis of the illumination device. In one embodiment, this information is stored in a data memory, optionally also the respective correlated color temperature of each light source. The control unit has at least temporary read access to the data memory and captures the information by means of read access to the data memory.

The configuration with the data memory makes it possible to use the same program for shading compensation for different illumination devices. The configuration of a particular illumination device is taken into account by corresponding information in the data memory, and the program can remain unchanged. As mentioned above, the control unit preferably executes this program on a processor while controlling the illumination device and performing shading compensation if necessary.

According to the invention, the control unit is capable of detecting a shading event and at least partially compensating for the detected shading. In the embodiments described so far, the shading event is caused by at least one object entering the area between the illumination device and the illuminated surface. In one embodiment, the embodiments just described to compensate for shading are used in the same way to compensate for the failure of at least one light source. In contrast to the embodiments just described, the control unit generally does not use a signal from the distance measuring arrangement to detect the failure of a light source, but evaluates signals from the light sources, for example the event that a light source has an electrical resistance above a predetermined threshold. The steps to compensate for the failure of at least one light source are the same as the steps to compensate for shading. In particular, the control unit determines which area on the illuminated surface is currently affected by the failure of a light source. This embodiment for compensating for the failure of at least one light source makes it possible in many cases to continue using the illumination device until the failed light source or each failed light source has been replaced.

The invention is described below by means of embodiment examples. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
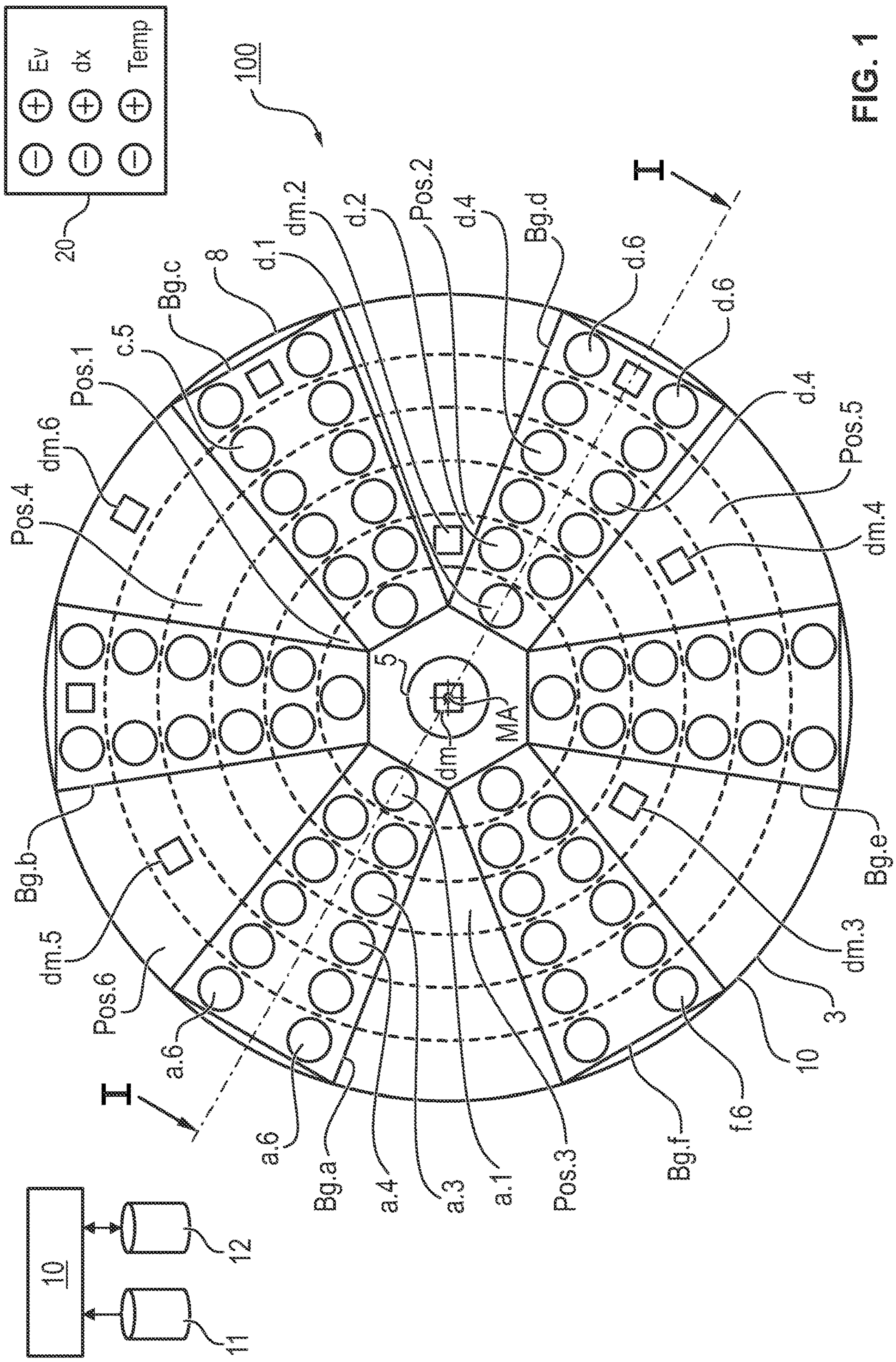
FIG. 1 is a schematic view showing the illumination device of an embodiment according to the invention, wherein the optical center axis is perpendicular to the drawing plane with a viewing direction toward the light sources of the illumination device.

Referring to the drawings, in the embodiment examples, the invention is used in an illumination device (lighting device) for an operating room, i.e. in an operating light. The illumination device illuminates an operating table on which a patient to be treated is lying. The illumination device is rotationally symmetrical to a center axis. The illumination device is attached to the ceiling using a bracket and can be freely positioned and oriented in the room.

The illumination device generates a light field on an illuminated surface. This illuminated surface is an operating table or the surface of a patient on the operating table that faces the illumination device. In several figures and the following description, a flat illuminated surface of an object is shown in simplified form and described accordingly. The object is designated as Obj, the illuminated flat surface pointing towards the illumination device is designated as Ob. The invention does not presuppose that the illuminated surface is a plane.

FIG. 1 shows schematically and exemplarily the illumination device 100 of the embodiment example, wherein the optical center axis MA of the illumination device 100 is perpendicular to the drawing plane of FIG. 1. A plurality of individual light sources a.1, . . . , a.6, b.1, . . . , b.6, . . . can be seen, each of which is represented by a circle (a ring) and is attached to a carrier (support) 8 with a circular cross-section. These circles extend in the drawing plane of FIG. 1. The viewer of FIG. 1 looks parallel to the optical center axis MA towards these light sources a.1, . . . , a.6, b.1, . . . , b.6, . . . . A handle 5, shown schematically, is attached to the surface of the carrier 8 facing the viewer, with the aid of which the illumination device 100 can be moved in space. In the embodiment example, the handle 5 has the shape of a truncated cone; it can also have the shape of a cylinder or a prism or truncated prism, for example.

In the embodiment example, each light source a.1, . . . , a.6, b.1, . . . , b.6, . . . is firmly attached to the carrier 8. Therefore, one light source cannot move relative to another light source of the illumination device 100. This configuration saves an actuator for a light source. However, it is also possible that individual light sources or at least one group of light sources can each be moved relative to the carrier 8 and preferably also relative to the other light sources with the aid of an actuator (not shown). In particular, the actuator makes it possible to move the light field generated by a light source relative to the illuminated surface Ob without moving the carrier 8.

Each individual light source a.1, . . . , a.6, b.1, . . . , b.6, . . . has an optical center axis, which is referred to below as the "light axis" to distinguish it from the optical center axis MA of the illumination device 100. The light beams together form a truncated cone whose diameter increases from the light source a.1, . . . , a.6, b.1, . . . , b.6, . . . , sometimes a cylinder or even a truncated cone whose diameter first decreases and then increases again from the light source a.1, . . . , a.6, b.1, . . . , b.6, . . . . In the following, the simplified term "light cone" with a "light divergence angle" is used. The term "light beam" would also be appropriate. Each individual light source a.1, . . . , a.6, b.1, . . . , b.6, . . . therefore generates a light cone. For example, $LA_{a.4}$ denotes the light axis and $Lk_{a.4}$ the light cone of light source a.4. In the lateral surface of the light cone $Lk_{a.4}$ shown, the individual illuminance is 10% of the maximum individual illuminance achieved along the light axis $LA_{a.4}$.

Figure 2:
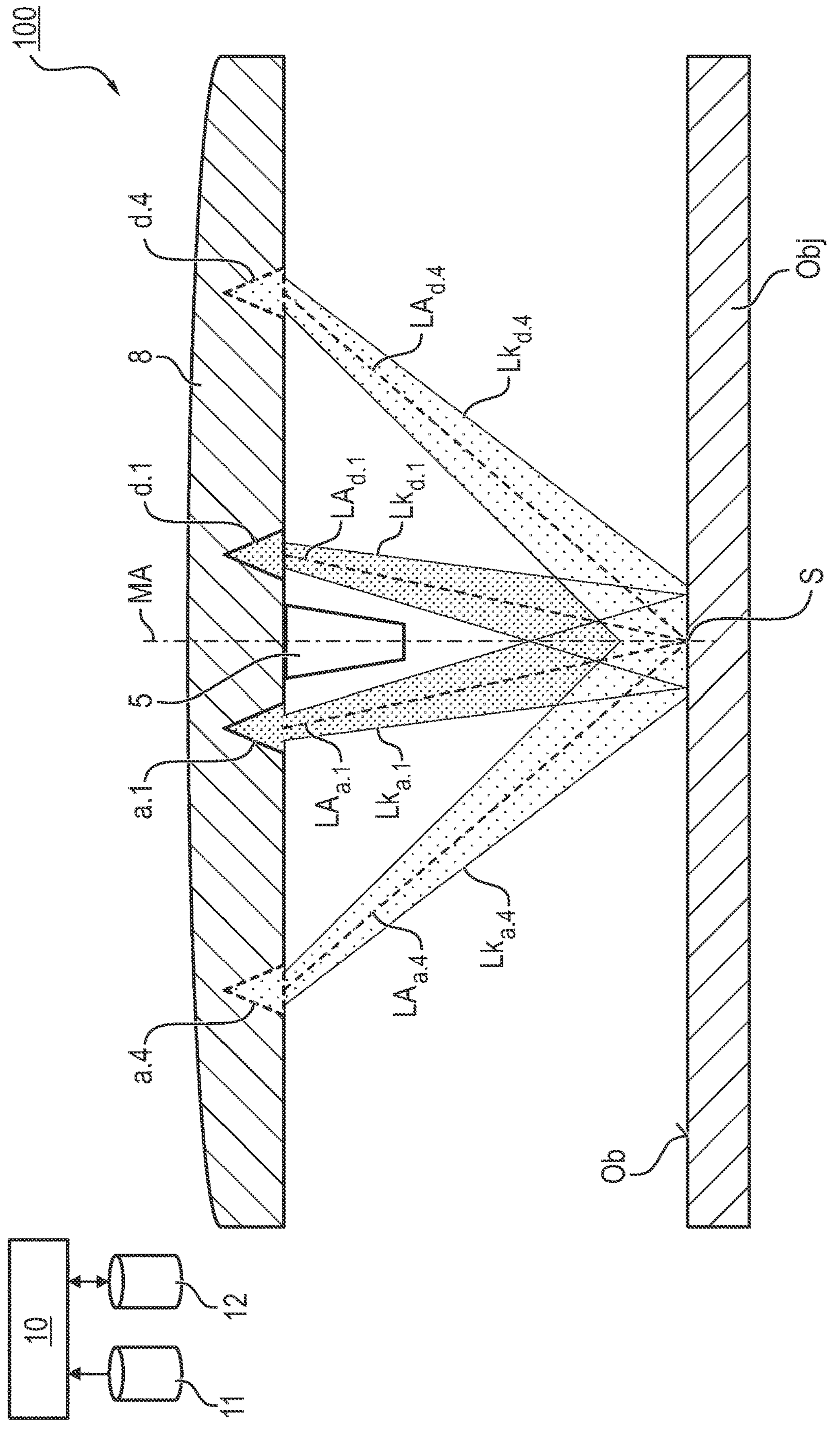
FIG. 2 is a schematic view showing light axes and light cones of the light sources of position groups Pos.1 and Pos.4.
Figure 4:
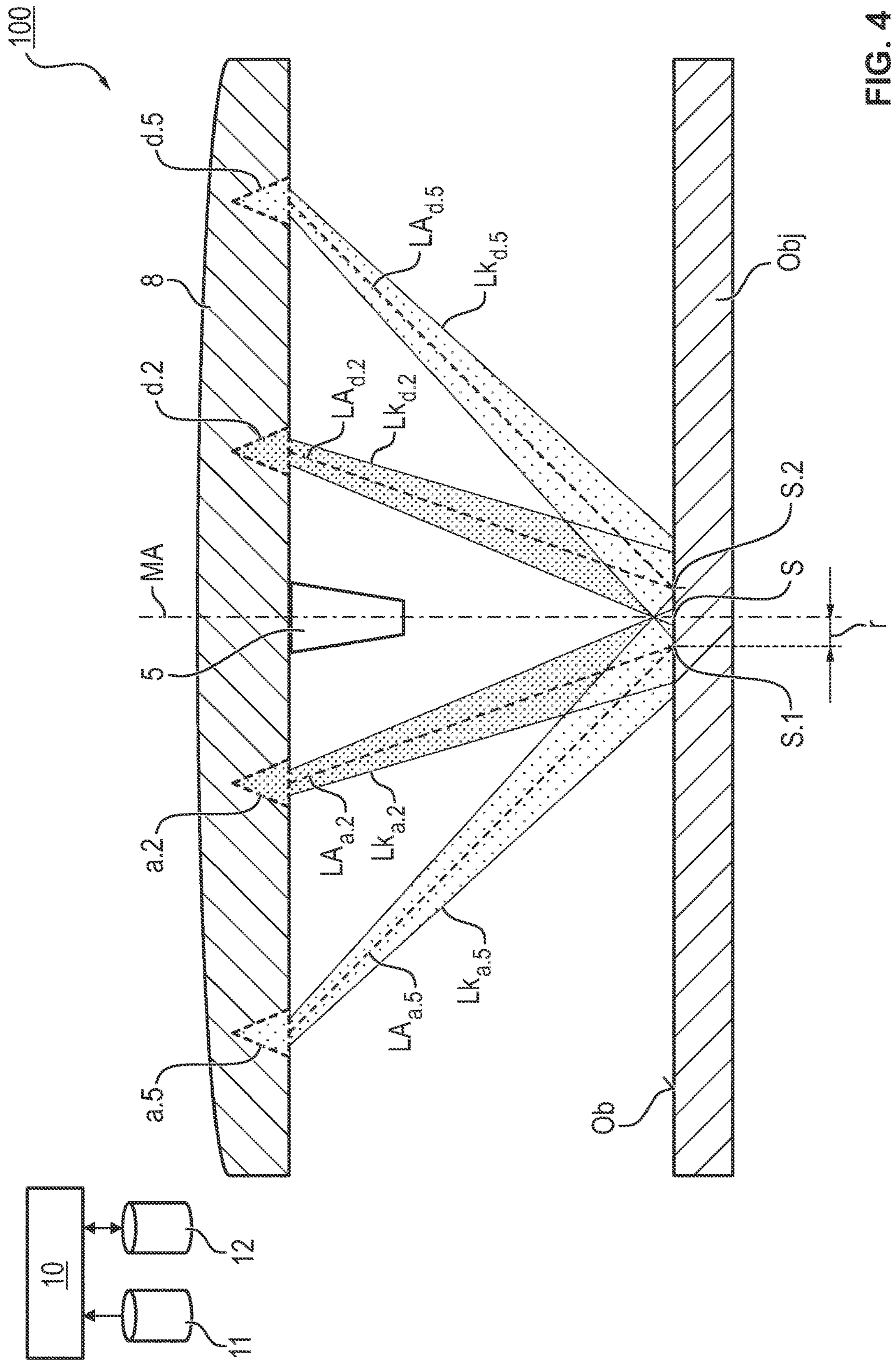
FIG. 4 is a schematic view showing the light axes and light cones of the light sources of position groups Pos.2 and Pos.5.
Figure 9:
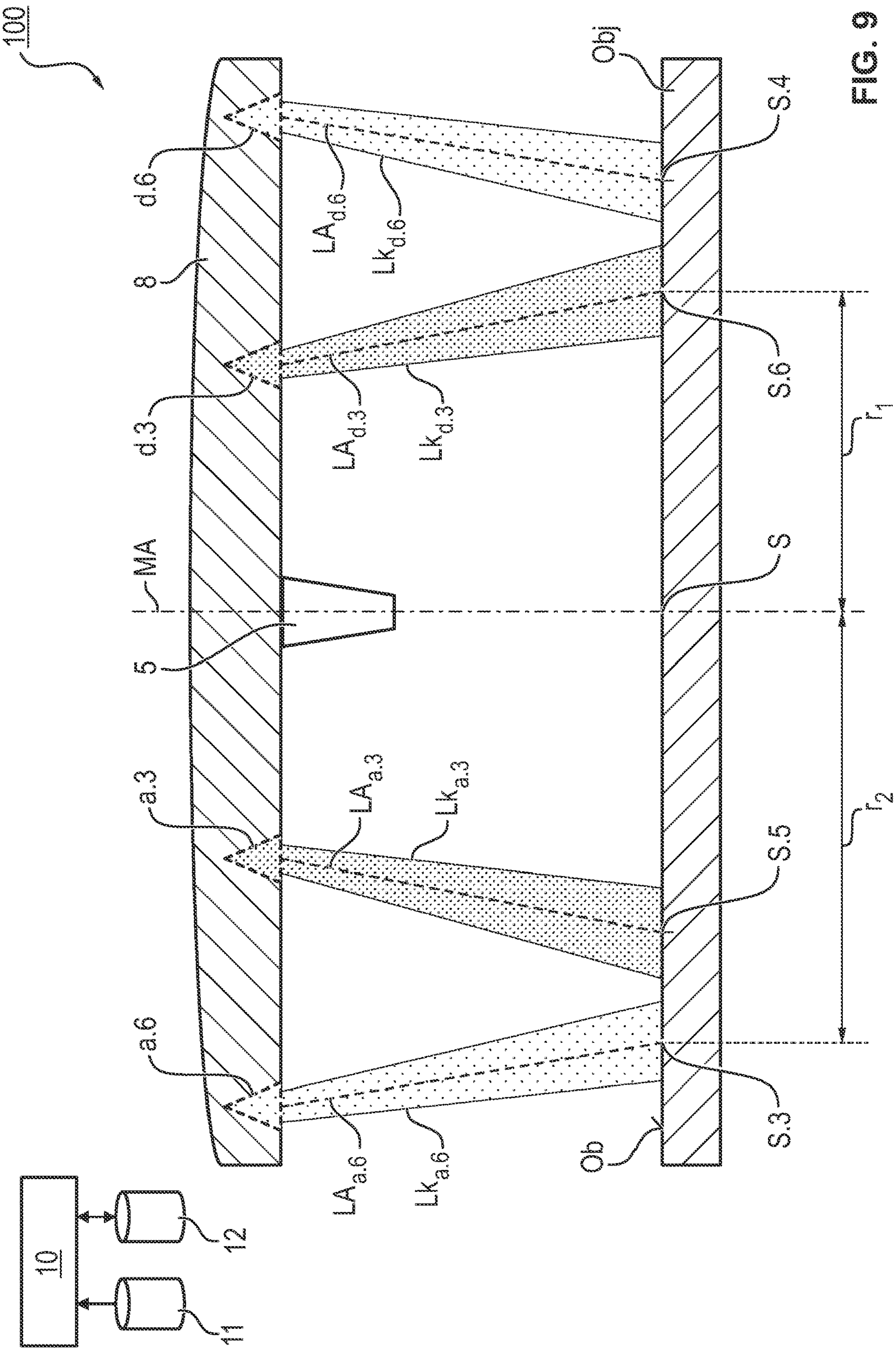
FIG. 9 is a schematic view showing the light axes and light cones of the light sources of position groups Pos.3 and Pos.6.

FIG. 2, FIG. 4 and FIG. 9 each show a cross-section in line I-I of FIG. 1. The center axis MA lies in the drawing planes of FIG. 2, FIG. 4 and FIG. 9. The figures are not necessarily to scale.

In the embodiment example, the illumination device 100 comprises 66 individual light sources. Of course, the invention can also be realized with any other reasonable number of light sources. The 66 light sources are divided on the one hand into assemblies and on the other hand into position groups. This is explained below with reference to FIG. 1.

In the example shown, the illumination device 100 comprises six assemblies Bg.a, . . . , Bg.f, which are arranged concentrically around the center axis MA of the illumination device 100, radiate from the center axis MA and are attached to the carrier 8. The assemblies Bg.a, . . . , Bg.f can also be arranged differently than concentrically around the center axis MA. In the implementation shown, each assembly Bg.a, . . . , Bg.f comprises eleven light sources. The assembly group Bg.a comprises the eleven light sources a.1, . . . , a.6, the assembly group Bg.b comprises the eleven light sources b.1, . . . , b.6 etc.

The arrangement and configuration of the assemblies Bg.a, . . . , Bg.f are only examples. Of course, a different number of assemblies and/or a different number of light sources are also possible. It is also possible that assemblies with a total of at least two different numbers of light sources a.1, . . . , a.6, b.1, . . . , b.6, . . . are used.

Preferably, each individual assembly can be replaced independently of any other assembly, i.e. an old assembly can be removed from the carrier 8 and a new assembly can be inserted.

In the embodiment example, the six assemblies Bg.a, . . . , Bg.f are fixedly arranged on the circular carrier 8 of the illumination device 100, so that no assembly Bg.a, . . . , Bg.f can be moved relative to another assembly. The respective eleven light sources of an assembly Bg.a, . . . , Bg.f are fixedly attached to the assembly Bg.a, . . . , Bg.f, so that no light source can be moved relative to another light source of the same assembly.

In the embodiment example, the 66 light sources of the illumination device 100 are also divided into six different position groups Pos.1, . . . , Pos.6. This number is also only to be understood as an example. Each light source belongs on the one hand to exactly one (one and only one) assembly group Bg.a, . . . , Bg.f and on the other hand to exactly one position group Pos.1, . . . , Pos.6.

In the embodiment example, the light sources of a position group pos.1, . . . , pos.6 all have the same distance from the center axis MA of the illumination device 100. The six position groups Pos.1, . . . , Pos.6 are arranged concentrically around the central axis MA. The innermost position group Pos.1 forms a circular ring around the handle 5, the other position groups Pos.2, . . . , Pos.6 form concentric circular rings around the innermost position group Pos.1. Each light source belongs to exactly one position group, so that the innermost position group Pos.1 comprises six light sources and the other five position groups Pos.2, . . . , Pos.6 each comprise twelve light sources.

The position groups, Pos.1, . . . , Pos.6 of the embodiment example, form the light source groups within the meaning of the patent claims. The light axes of the light sources of a position group are preferably arranged parallel to each other.

The numbering of the light sources indicates to which assembly group and to which position group a light source belongs: The light sources a.x, b.x, . . . , f.x belong to position group Pos.x (x=1, . . . , 6) and to assembly group a, b, . . . , f.

As can be seen in FIG. 1, in the embodiment example, two individual light sources belong to the same assembly and to the same position group—with the exception of the light sources of the inner position group Pos.1. The light axes of these two light sources are ideally arranged in such a way that they intersect at the reference distance. On a plane at the reference distance, the two light sources ideally generate two light fields that match except for an offset perpendicular to the light axis and optionally except for a rotation around the light axis. These two light sources are therefore treated as a single light source in the following and therefore have the same designation. Optionally, the two light sources emit light in different correlated color temperatures, and these color temperatures are superimposed to form an entire color temperature of these two light sources.

Preferably, the same angle always occurs between the light axes of the light sources of a position group Pos.1, . . . , Pos.6 and the optical center axis MA of the illumination device 100. The light axes of the light sources or at least some of the light sources can also be arranged at an angle to the optical center axis MA. If the angle between the light axis and the optical center axis MA is always the same, the light cone and the light field, which the light sources of a position group generate together, are idealized rotationally symmetrical to the center optical axis MA.

For illustrative purposes, the light cones of two different position groups in FIG. 2, FIG. 4 and FIG. 9 are shown hatched (shaded) differently. An intersection point S is also shown. At this intersection point S, the optical center axis MA of the illumination device 100 intersects the illuminated surface Ob.

Figure 3:
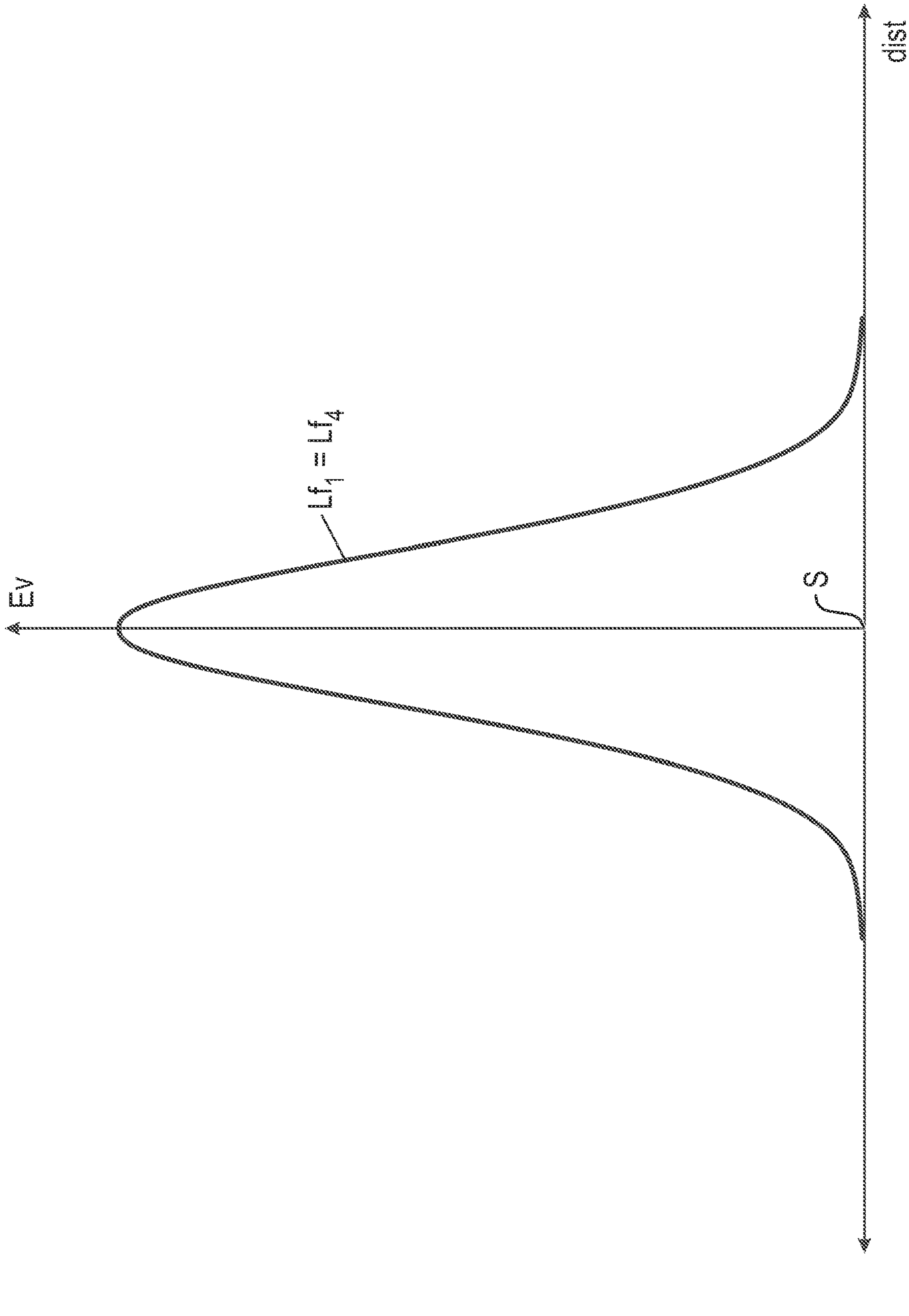
FIG. 3 is a graph showing the light fields obtained for the two position groups in FIG. 2 by means of a diagram in the x-z plane.
Figure 8:
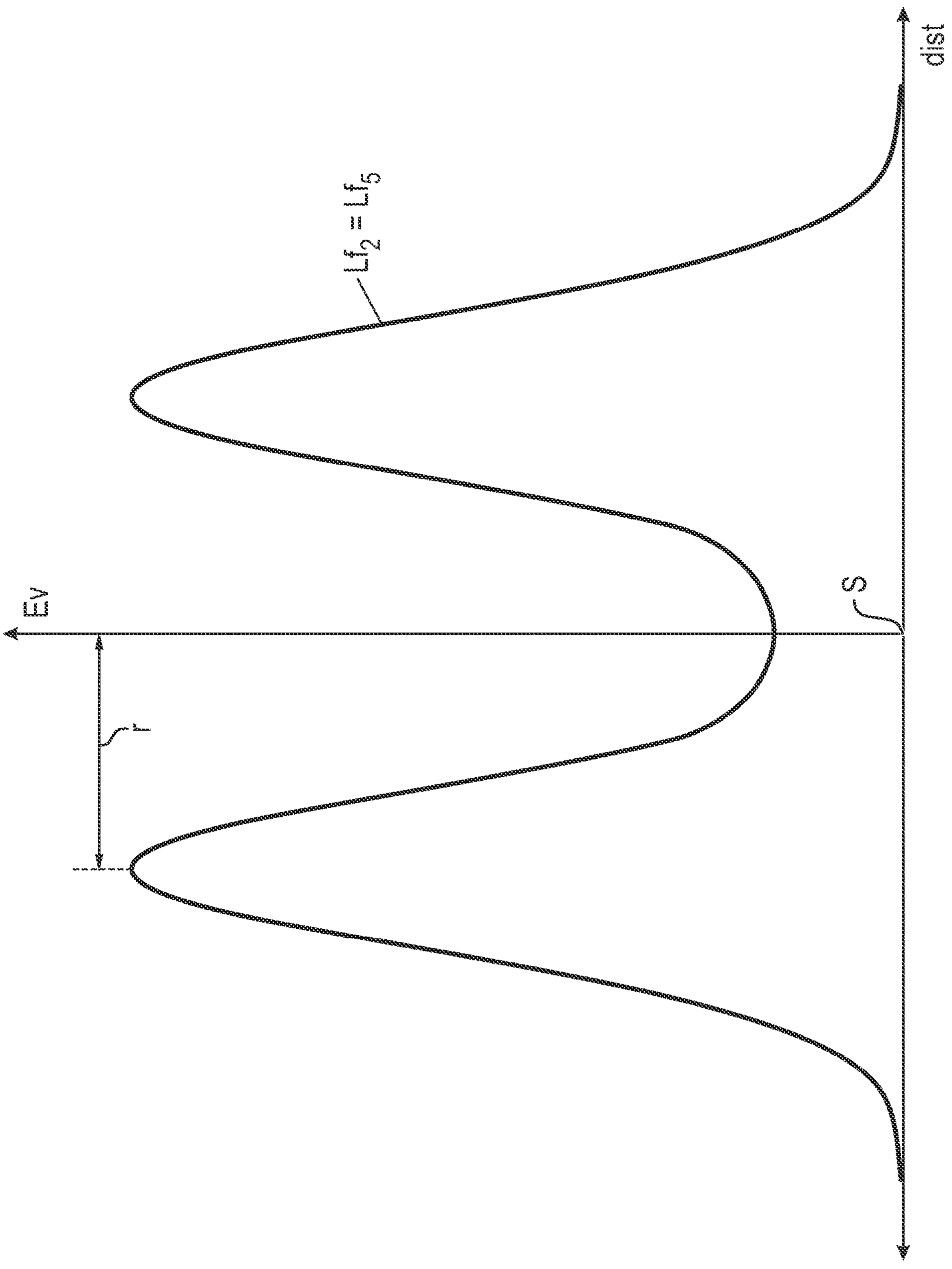
FIG. 8 is a graph showing the light fields obtained for the two position groups in FIG. 4 by means of a diagram in the x-z plane.
Figure 10:
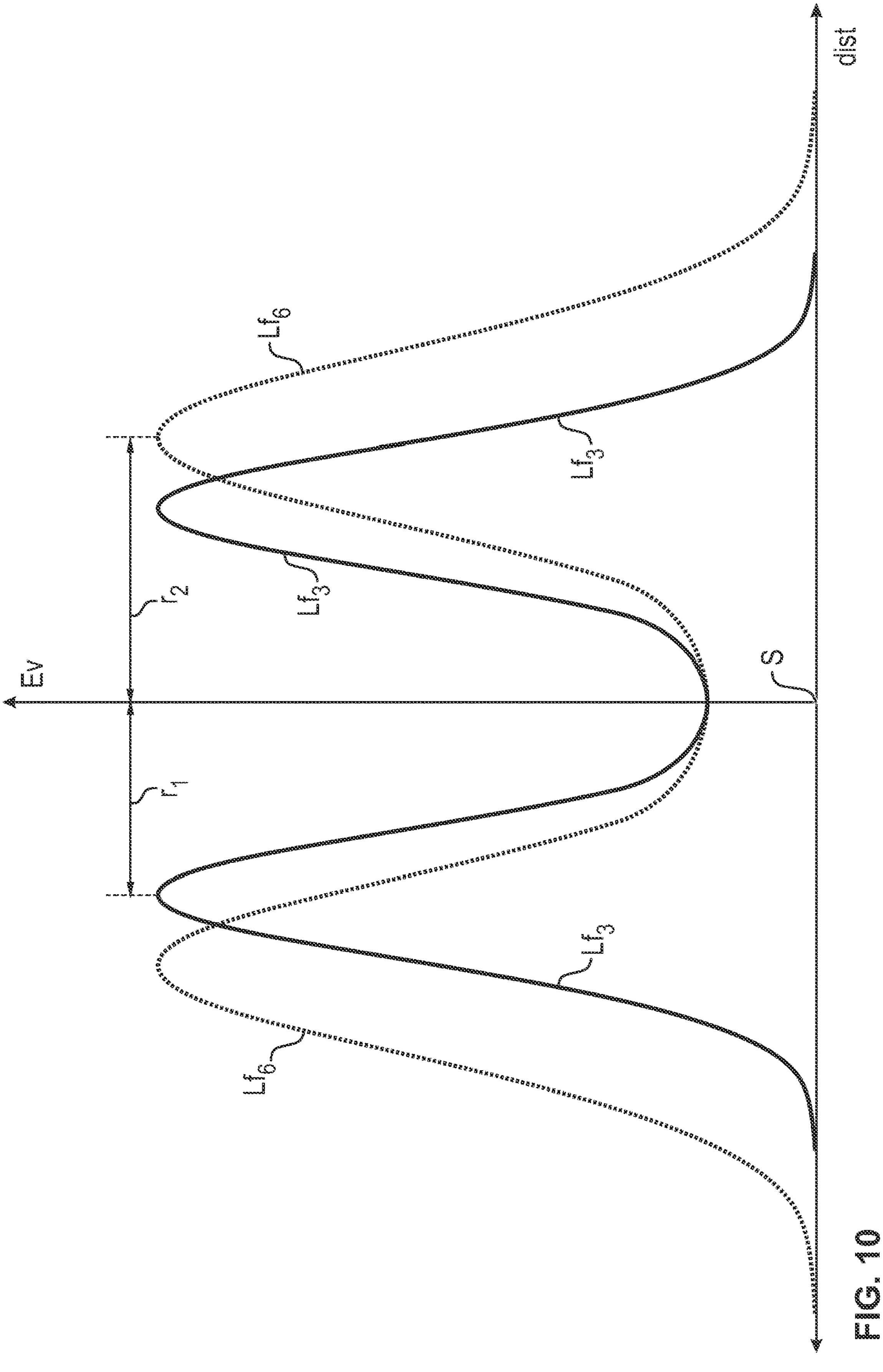
FIG. 10 is a graph showing the light fields obtained for the two position groups in FIG. 9 by means of a diagram in the x-z plane.

FIG. 3, FIG. 8 and FIG. 10 each illustrate a generated light field, which is described in more detail below. The illustration shows a light field in the x-z plane. The intersection point S lies at the origin of the coordinate system. The y-axis is perpendicular to the drawing plane. The illuminance Ev achieved in each case is plotted on the z-axis.

In the embodiment example, the light sources a.1, . . . , a.6, b.1, . . . , b.6, . . . are mounted on the carrier 8 in such a way that the light axes and the light cones of the light sources of a position group Pos.2, . . . , Pos.6 are arranged rotationally symmetrically about the center axis MA of the illumination device 100. Therefore, the representations of FIG. 2, FIG. 4 and FIG. 9 also apply accordingly to other sectional views in which the optical center axis MA lies in the drawing plane, for example a sectional view through the assemblies Bg.c and Bg.f.

Preferably, each light source a.1, . . . , a.6, b.1, . . . , b.6, . . . emits light along a respective light axis $LA_{a.1}$, . . . , $LA_{a.6}$, $LA_{b.1}$, . . . , $LA_{b.6}$, . . . . The light cone of the light emitted by a light source a.1, . . . , a.6, b.1, . . . , b.6, . . . is rotationally symmetrical to the respective light axis $LA_{a.1}$, . . . , $LA_{a.6}$, $LA_{b.1}$, . . . , $LA_{b.6}$, . . . and is preferably less than 20 degrees, particularly preferably less than 15 degrees, especially between 5 and 12.5 degrees.

Each light source a.1, . . . , a.6, b.1, . . . , b.6, . . . achieves a current maximum individual illuminance, which generally occurs on its light axis $LA_{a.1}$, . . . , $LA_{a.6}$, $LA_{b.1}$, . . . , $LA_{b.6}$, . . . . It is also possible that a local minimum of the individual illuminance is achieved on the light axis. Ideally, this current maximum individual illuminance can be changed continuously between zero and a maximum achievable individual illuminance of the light source, independently of the respective current maximum individual illuminance of each other light source. It is also possible that the respective individual illuminance of each light source can be changed in several stages, again independently of the respective individual illuminance of each other light source. For example, 8 bits=256 different levels are possible in each case. At the very least, however, each light source can be switched on and off independently of every other light source.

In one embodiment, all light sources a.1, . . . , a.6, b.1, . . . , b.6, . . . are of identical construction. In a preferred embodiment, however, two different types of light sources are used, with light sources of a first type emitting warm white light and light sources of a second type emitting cool white light. In one embodiment, all light sources achieve the same maximum achievable individual illuminance and have the same light divergence angle. It is also possible for light sources to differ in terms of the maximum achievable individual illuminance and/or the light divergence angle.

A signal-processing control unit 10, shown only schematically, is able to control each individual light source a.1, . . . , a.6, b.1, . . . , b.6, . . . of the illumination device 100 and thereby in particular to cause the current maximum individual illuminance which a light source a.1, . . . , a.6, b.1, . . . , b.6, . . . on the illuminated surface Ob generates, to be changed, the change is effected independently of the respective current maximum individual illuminance of each other light source.

The light sources are preferably operated in pulsed mode. In order to change the maximum individual illuminance of a light source, the control unit 10 can change the pulse width or also the pulse duration or pulse frequency of the electrical pulses. With pulse width modulation, the ratio between the duration of an electrical pulse and the duration of a pause between two electrical pulses is changed. It is also possible for the control unit 10 to change the strength of the current flowing through a light source or the electrical voltage applied.

In one implementation, the control unit 10 has at least temporary read access to a data memory 11. By means of read access to this data memory 11 and optionally by means of a subsequent calculation, the control unit 10 is able to determine the following information for each light source a.1, . . . , a.6, b.1, . . . , b.6, . . . in each case:

- the maximum achievable individual illuminance,
- how the current maximum individual illuminance depends on a variable electrical parameter with which the light source is controlled, for example the pulse width, the current and/or the voltage,
- the respective position on the carrier 8, in particular the distance from and the rotational position relative to the optical center axis MA of the illumination device 100,
- the orientation of the light axis relative to the center axis MA,
- the light divergence angle and
- the correlated color temperature.

This information is predetermined by the configuration of the illumination device 100 or can be determined empirically or theoretically in advance. In one implementation, an algorithm in the form of a computer program is stored in this data memory 11, which the control unit 10 uses and which is valid for every similar illumination device 100. The information just listed about the light sources is permanently implemented in this algorithm. In another form of implementation, this algorithm is stored in the control unit 10 in a different way. In the following, it is abbreviated to mean that the control unit 10 reads in the information about the individual light sources by means of read access to the data memory 11.

The information from the data memory 11 is used to adjust the illumination device 100 so that it ideally produces a desired total light field on the illuminated surface Ob. During operation, this information does not change as long as the illumination device 100 is not modified and therefore remains valid.

As already explained, the control unit 10 is able to change the current maximum individual illuminance of a light source independently of the respective current maximum individual illuminance of any other light source, preferably continuously or with more than one hundred different steps between the maximum achievable individual illuminance and zero. In one implementation form, this respective current maximum individual illuminance is stored in a data memory 12, to which the control unit 10 has at least temporary read access and write access. If the control unit 10 changes the current maximum individual illuminance of a light source, the control unit 10 also changes the corresponding entry in this data memory 12.

The illumination device 100 comprises an input unit 20, for example a touch screen and/or an arrangement with several buttons. This input unit 20 is arranged, for example, on the carrier 8, on the handle 5 or at a distance from the carrier 8 and from the handle 5 and is shown as an example in FIG. 1. With the aid of this input unit 20, a user can specify the lighting which the illumination device 100 is to generate on the illuminated surface Ob. In particular, the user can assign a value to at least one, preferably each of the following parameters, for example using a slider or a rotary knob:

- an illuminance specification, i.e. the current maximum entire illuminance that the illumination device 100 should achieve at the reference distance (in FIG. 1: Ev),
- a light field diameter $d_x$, where the term light field diameter has been defined above and where preferably x=10% (in FIG. 1: $d_x$), and
- a correlated color temperature that correlates with the light spectrum of the illumination device (in FIG. 1: Temp).

Alternatively, the user can increase or decrease the current value without necessarily having to read off a current value or enter a desired value.

It is also possible that, in addition or instead, a higher-level control system assigns a different value to at least one of these parameters. Preferably, the parameters refer to the above-mentioned reference distance of e.g. 1 m and to a flat illuminated surface Ob that is perpendicular to the optical center axis MA.

The control unit 10 captures (acquires) these specifications from a user or a higher-level control system and controls the light sources a.1, . . . , a.6, b.1, . . . , b.6, . . . with the objective of ensuring that the illumination device 100 generates a light field on the illuminated surface Ob whose actual values are equal to the specifications. As a rule, this objective is only achieved approximately. The light field and, in particular, the light field diameter and the maximum entire illuminance as well as the correlated color temperature of the illumination device 100 are created by superimposing the light fields and correlated color temperatures of the individual light sources a.1, . . . , a.6, b.1, . . . , b.6, . . . . In order to adjust the light field of the illumination device 100, the control unit 10 controls the individual light sources a.1, . . . , a.6, b.1, . . . , b.6, . . . as described above and, in particular, changes the current maximum individual illuminance and optionally the correlated color temperature of each light source as required. In order to change the correlated color temperature of the illumination device 100, the control unit 10 preferably increases or decreases the individual illuminance of warm white or cool white light sources.

FIG. 2 shows an example of the light axes $LA_{a.1}$, $LA_{d.1}$ and the light cones $Lk_{a.1}$, $Lk_{d.1}$ of two light sources a.1 and d.1 of the position group Pos.1 and the light axes $LA_{a.4}$, $LA_{d.4}$ and light cones $Lk_{a.4}$, $Lk_{d.4}$ of two light sources a.4 and d.4 of the position group Pos.4. The optical center axis MA of the illumination device 100 and the light axes of these four light sources lie in the drawing plane of FIG. 2.

The two position groups Pos.1 and Pos.4 are arranged in such a way that each light axis of a light source of position group Pos.1 or position group Pos.4 intersects the illuminated surface Ob at the intersection point S. This is shown in FIG. 2 as an example for the four light sources a.1, d.1, a.4, d.4 shown.

FIG. 3 shows the two light fields $Lf_1$ and $Lf_4$, which the light sources of the position groups Pos.1 and Pos.4 generate together. The optical center axes $LA_{a.1}$, . . . , $LA_{d.4}$ of the four light sources a.1, . . . , d.4 shown in FIG. 2 intersect at the intersection point S between the optical center axis MA and the illuminated surface Ob of the object Obj. Therefore, the illuminance Ev is greatest at this intersection point S and decreases with increasing distance dist, the illuminance Ev decreasing in the form of a bell curve. In the example shown, the two light fields $Lf_1$ and $Lf_4$ match geometrically, i.e. they have the same maximum individual illuminance and the same light field diameter $d_{10}$ on the surface Ob, and they also match in terms of color temperature. Therefore, the two position groups Pos.1 and Pos.4 are (intentionally) redundant, namely because they generate the same light field $Lf_1$ and $Lf_4$ on the surface Ob.

FIG. 4 shows the four light axes $LA_{a.2}$, $LA_{a.5}$, $LA_{d.2}$, $LA_{d.5}$ and the four light cones $Lk_{a.2}$, $Lk_{a.5}$, $Lk_{d.2}$, $Lk_{d.5}$ of the four light sources a.2, a.5, d.2, d.5 of the position groups Pos.2 and Pos.5. The light axes $LA_{a.2}$ and $LA_{a.5}$ of the light sources a.2 and a.5 intersect at the same intersection point S.1 with the illuminated surface Ob of the object Obj, and this intersection point S.1 has a distance r to the center axis MA and therefore to the intersection point S. The light axes $LA_{d.2}$ and $LA_{d.5}$ of the light sources d.2 and d.5 also intersect at the same intersection point S.2 with the illuminated surface Ob of the object Obj, and this intersection point S.2 has the same distance r to the center axis MA and a distance 2*r to the intersection point S.1 of the light axes $LA_{a.2}$ and $LA_{a.5}$.

Therefore, each light field $Lf_2$ and $Lf_5$ of a plane in which the light axis lies has two maxima, each of which has a distance r from the center axis MA, see FIG. 8. The maxima form a circle with the radius r. In general, the intersection points S.1, S.2 of the light axes of the light sources of the position groups Pos.2 and Pos.5 form a circle around the intersection point S of the optical center axis MA with the surface Ob. The two position groups Pos.2 and Pos.5 are partially redundant because although they have two light fields $Lf_2$, $Lf_5$ around the same circle, whereby this circle has the center point S, one light field $Lf_2$ does not correspond exactly with the other light field $Lf_5$, in particular if the light sources differ from each other in terms of their maximum individual illuminances and/or the light field diameter and/or the correlated color temperatures. For example, the light field of one light source is rotated around the optical center axis MA relative to the light field of another light source.

Figure 5B:
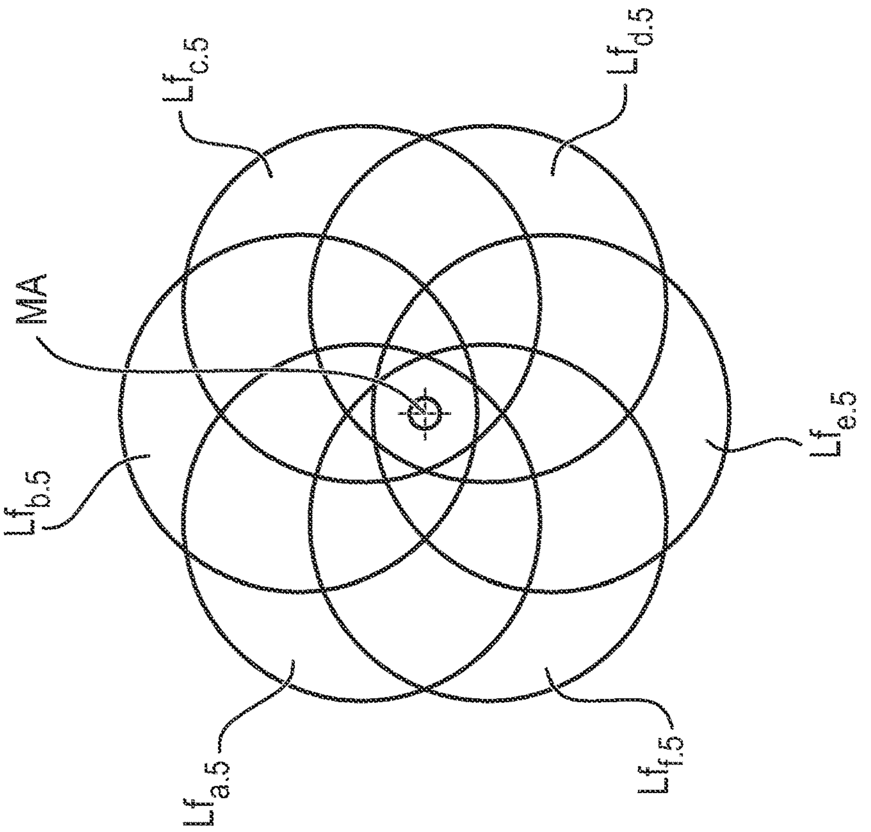
FIG. 5*a* and FIG. 5*b* are views showing a first implementation of how the light fields of the light sources of the two position groups of FIG. 4 are positioned relative to each other.
Figure 5A:
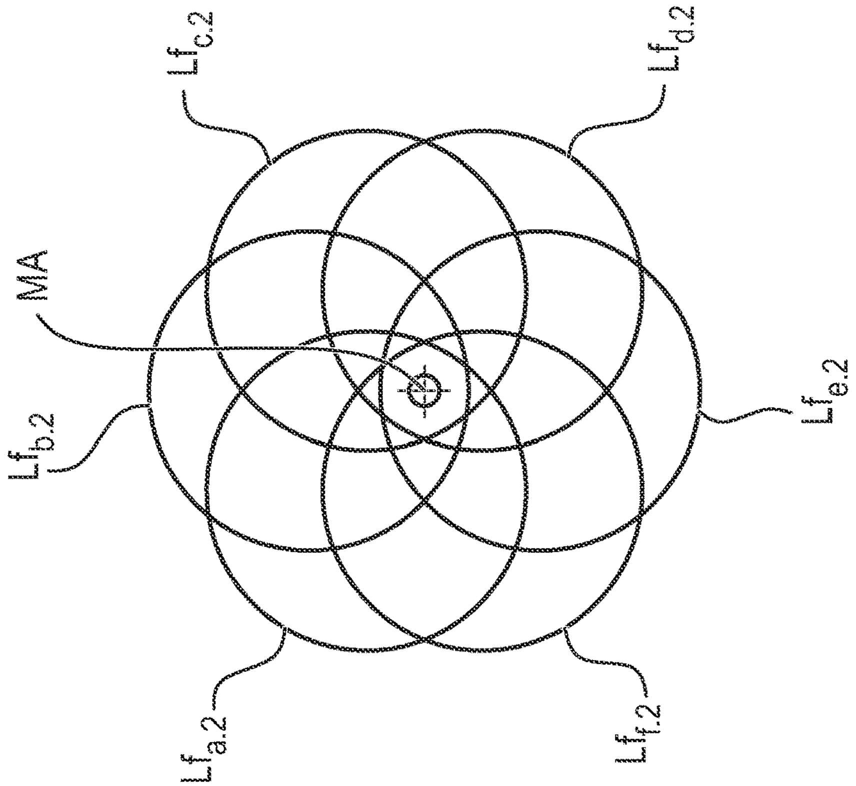
Figure 6B:
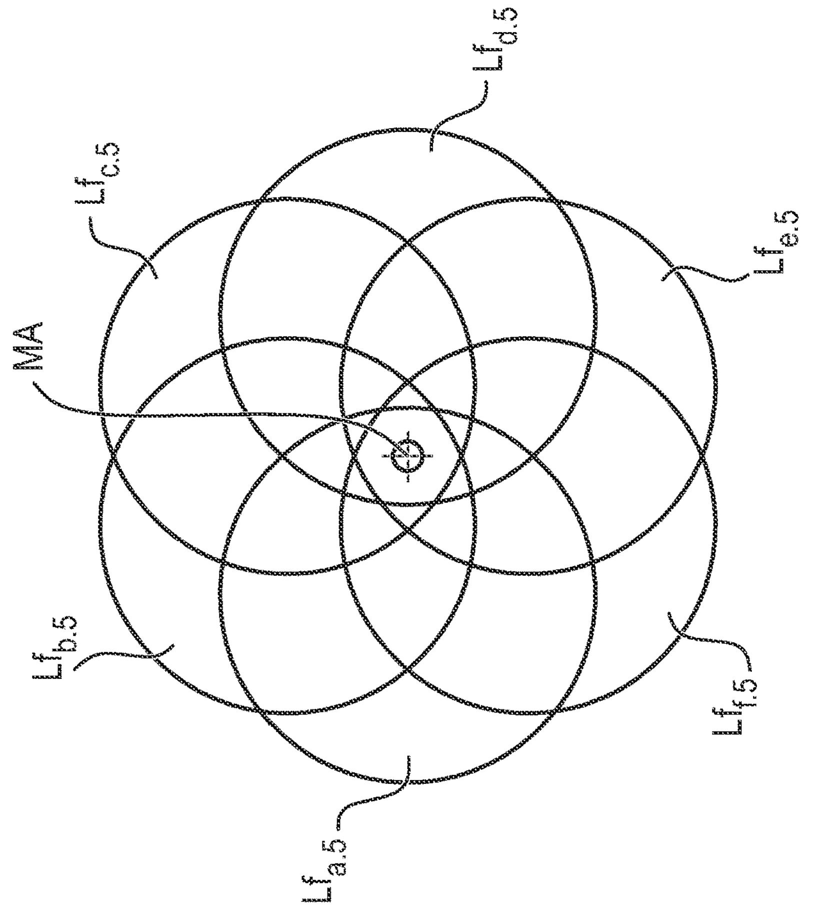
FIG. 6*a* and FIG. 6*b* are views showing a second implementation of how the light fields of the light sources of the two position groups of FIG. 4 are positioned relative to each other.
Figure 6A:
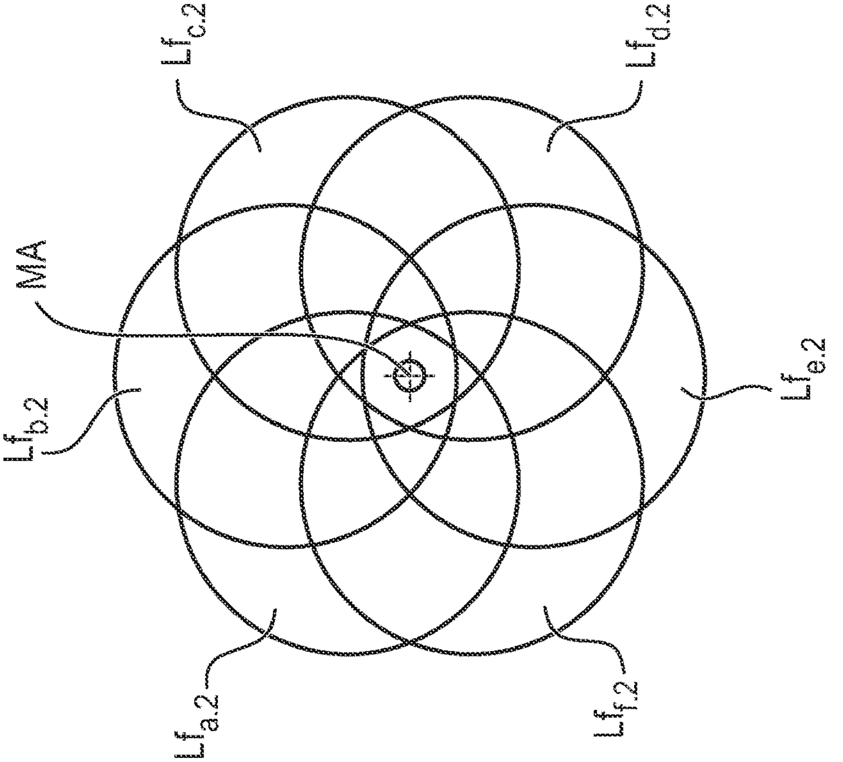
Figure 7B:
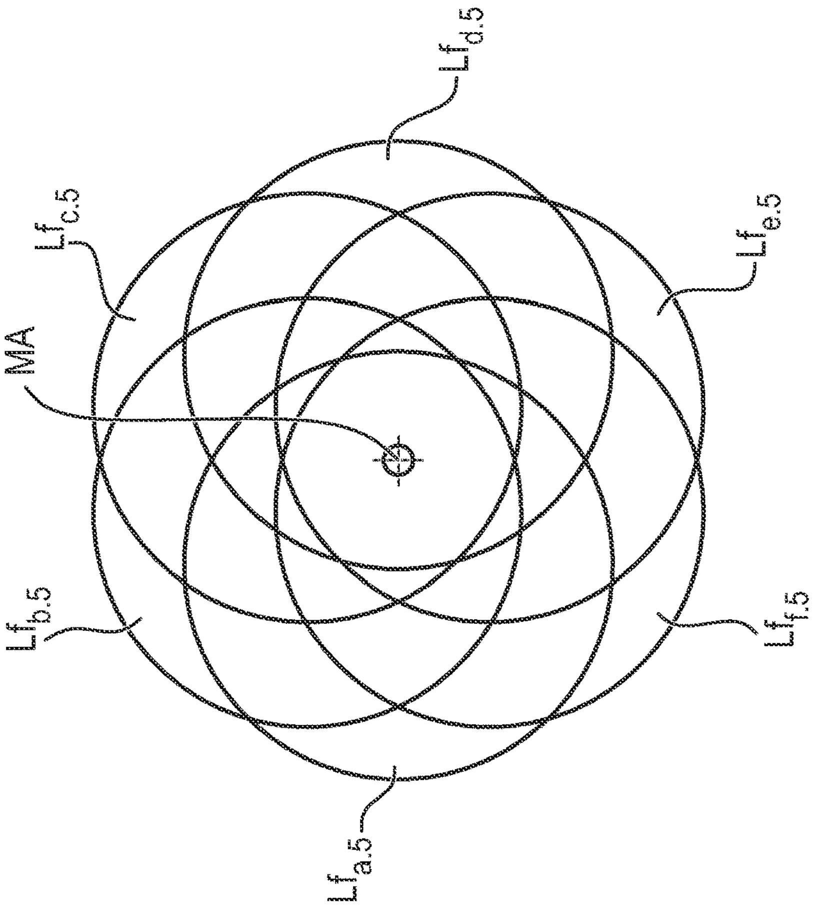
FIG. 7*a* and FIG. 7*b* are views showing a third implementation of how the light fields of the light sources of the two position groups of FIG. 4 are positioned relative to each other.
Figure 7A:
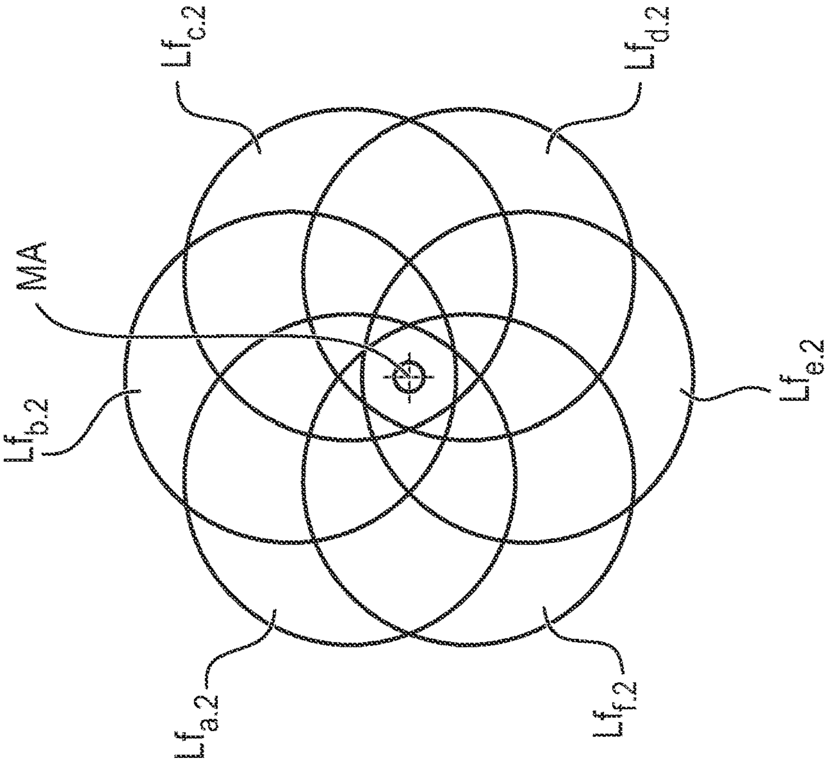

FIG. 5, FIG. 6 and FIG. 7 show examples of three alternative ways in which the six light fields of the six light sources of position group Pos.5 can be positioned relative to the six light fields of the light sources of position group Pos.2, see FIG. 4. The center axis MA of the illumination device 100 is perpendicular to the drawing planes of FIG. 5, FIG. 6 and FIG. 7. In each case, the light field diameters $d_{10}$ of the light fields generated by the six light sources of position group Pos.2 (left) and the light field diameters $d_{10}$ of the light fields generated by the six light sources of position group Pos.5 (right) are shown.

In the example of FIG. 5, the six light fields match in pairs, i.e. each light field of a light source of position group Pos.2 matches a light field of a light source of position Pos.5 in terms of shape and position, in particular in terms of the light field diameter. In the example in FIG. 6, the light fields of the light sources in position group Pos.5 are rotated clockwise by about 20 degrees relative to the six light fields of the light sources in position group Pos.2, but do not have the same position on the surface Ob. More precisely, each light field of a light source of position group Pos.5 has a light field of the same shape and in particular the same light field diameter as a light field of a light source of position group Pos.5, but not the same position, but is rotated about the center axis MA. In the example in FIG. 7, the six light fields of the light sources in position group Pos.5 each have a larger light field diameter than the six light fields of the light sources in position group Pos.2. In addition, the light fields of the light sources in position group Pos.5 are rotated by approximately 20 degrees relative to the light fields of the light sources in position group Pos.2. Of course, other situations are also possible. The common feature is that the maxima of the light fields of the light sources in position group Pos.2 and the maxima of the light fields of the light sources in position group Pos.5 lie on the same circle around the optical center axis MA.

FIG. 9 shows the four light axes $LA_{a.3}$, $LA_{a.6}$, $LA_{d.3}$, $LA_{d.6}$ and the four light cones $Lk_{a.3}$, $Lk_{a.6}$, $Lk_{d.3}$, $Lk_{d.6}$ of the four light sources a.3, a.6, d.3, d.6. FIG. 10 shows the two light fields $Lf_3$ and $Lf_6$, which together generate the light sources of the position groups Pos.3 and Pos.6. The center axes $LA_{a.3}$ and $LA_{d.3}$ intersect the illuminated surface Ob at two intersection points S.5 and S.6, which are each at a distance of $r_1$ from the center axis MA and at a distance of $2*r_1$ from each other. The center axes $LA_{a.6}$ and $LA_{d.6}$ also intersect the illuminated surface Ob at two intersections S.3 and S.4, which are each at a distance of $r_2$ from the center axis MA and at a distance of $2*r_2$ from each other, see FIG. 9. $r_2>r_1$ applies. A total of four different and spaced-apart intersections S.3, . . . , S.6 are shown in FIG. 9.

The light field $Lf_3$ is concentrically surrounded by the light field $Lf_6$. The maximum of the light field $Lf_3$ has a distance of $r_1$ to the center axis MA, the maximum of the light field $Lf_6$ has a distance of $r_2$. The two position groups Pos.3 and Pos.6 are not redundant because they generate different light fields $Lf_3$ and $Lf_6$ respectively. These two light fields $Lf_3$ and $Lf_6$ are shown in FIG. 10. In the example shown, the position groups Pos.3 and Pos.6 are also not partially redundant because the maxima are located on different circular rings.

In the embodiment example, the illumination device 100 comprises at least one, preferably several, distance meters. The distance meter or each distance meter is capable of measuring in a contactless manner the distance between itself and a light-scattering surface. Preferably, the distance meter or each distance meter emits electromagnetic radiation towards the illuminated surface Ob, preferably in the infrared range, optionally in the ultraviolet range. Part of the scattered radiation reaches the distance meter, and the distance meter measures the transit time and derives the distance from this. As an example, FIG. 1 shows a central distance meter dm and a respective distance meter dm.2, . . . , dm.6 for each position group Pos.2, . . . , Pos.6. Other principles for non-contact distance measurement are also possible.

The central distance meter dm and the further distance meter or each further distance meter dm.2, . . . , dm.6 are fixed to the carrier 8 in the embodiment example, and therefore the position and orientation of a distance meter dm, dm.2, . . . , dm.6, . . . relative to the carrier 8 are unchangeable. The respective position and orientation of each distance meter on the carrier 8 are stored in the above-mentioned data memory 11. As already mentioned, the control unit 10 has read access to this data memory 11.

In a preferred embodiment, the distance meter or at least one distance meter of the illumination device 100 is capable of generating a topological profile of the illuminated surface Ob. One implementation of such a distance meter has become known as a "time-of-flight sensor". In some implementations, laser scanners and 3D camera systems are also suitable for generating a topological profile. It is also possible that a plurality of distance meters together generate signals from which the control unit 10 determines a topological profile.

Figure 11:
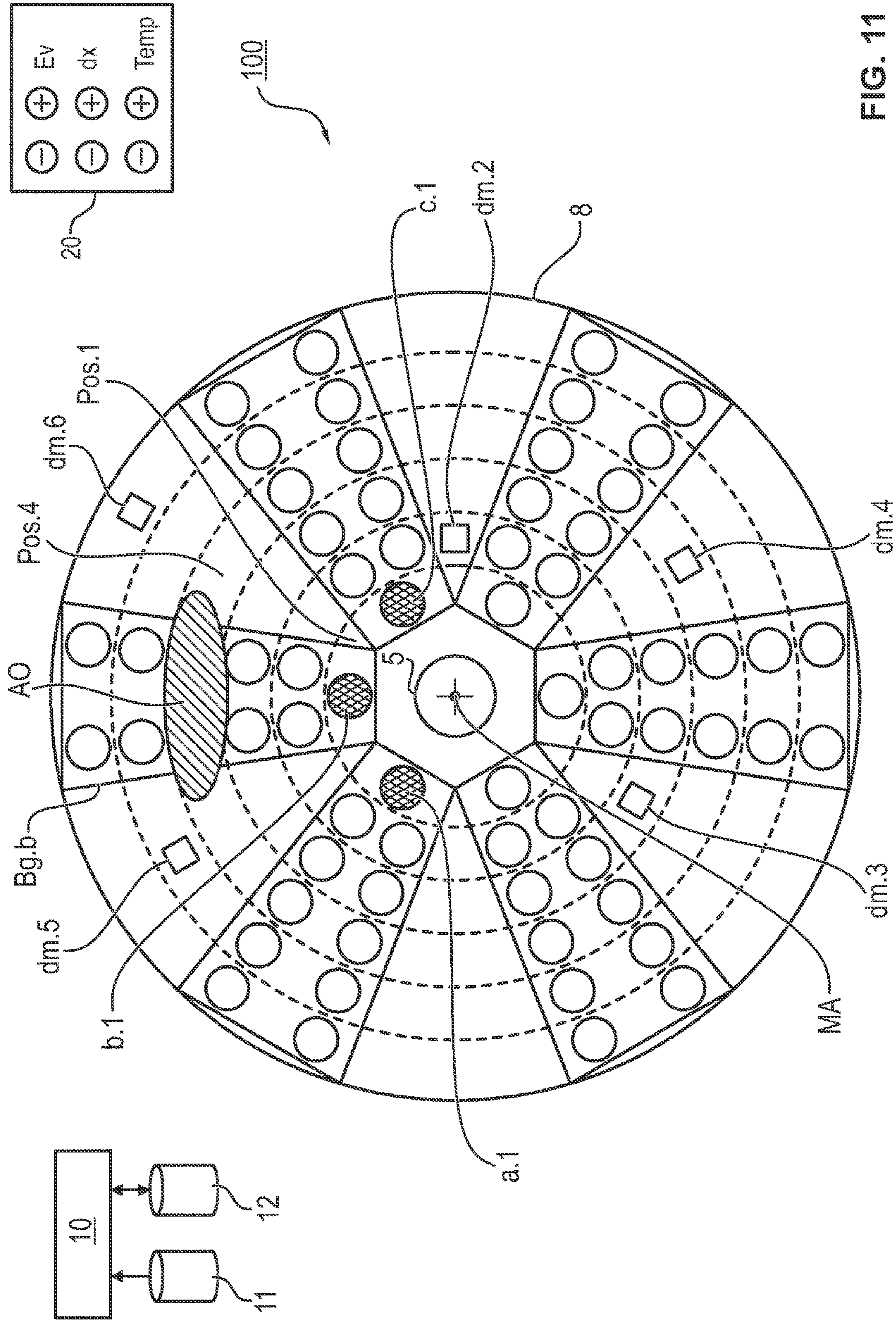
FIG. 11 is a schematic view showing a first example of a shading object.
Figure 12:
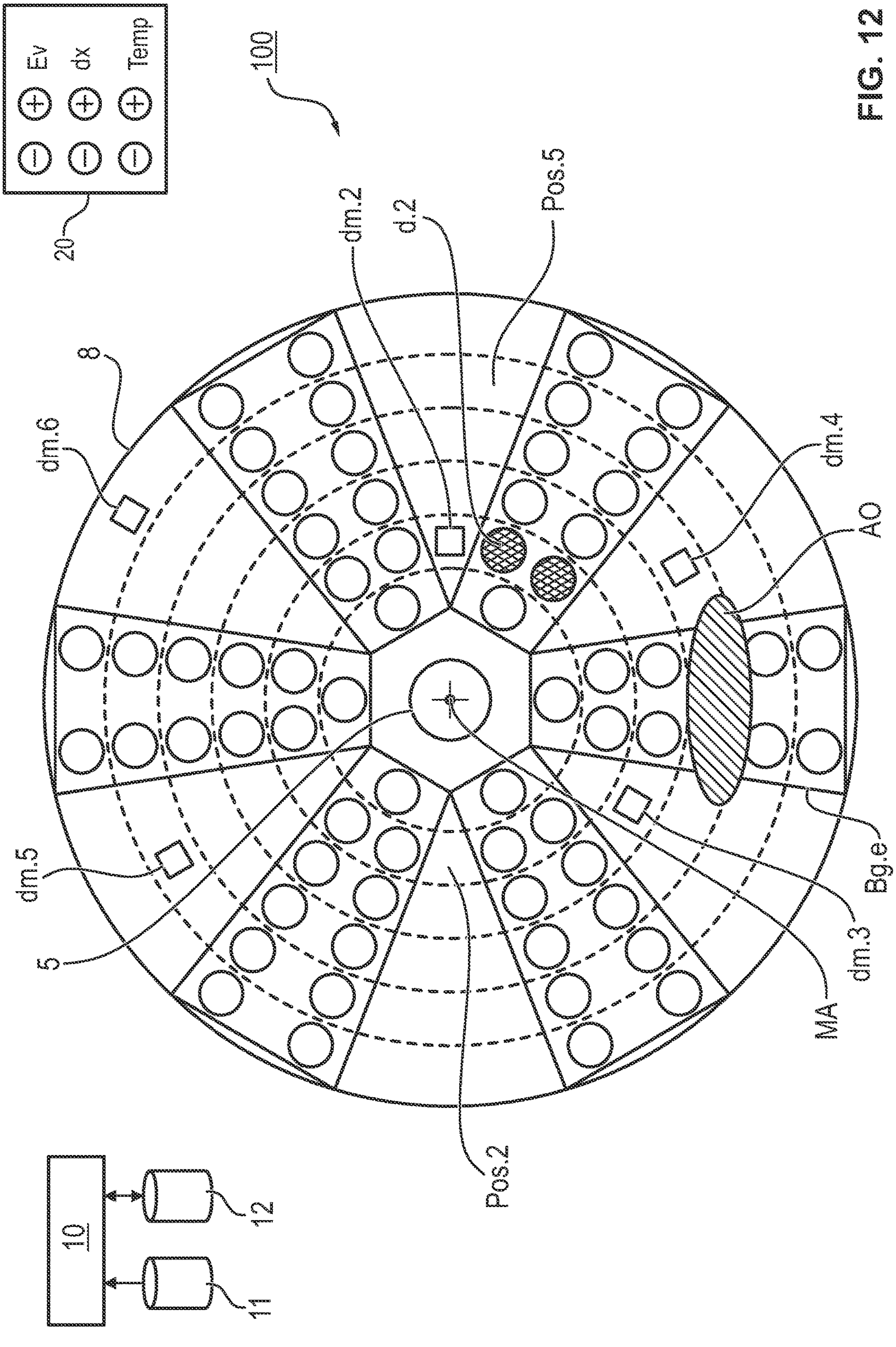
FIG. 12 is a schematic view showing a second example of a shading object.
Figure 13:
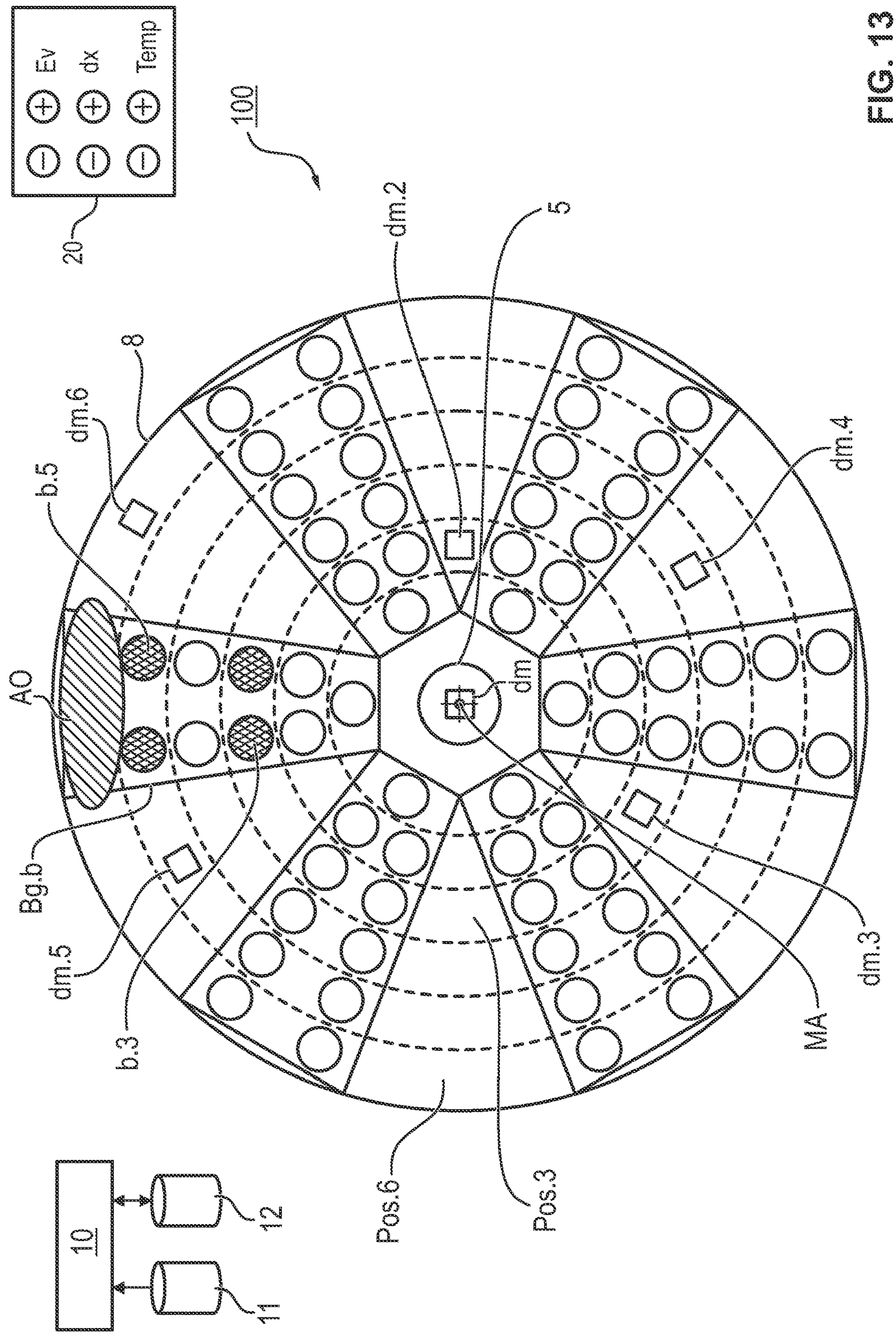
FIG. 13 is a schematic view showing a third example of a shading object.

It is possible for an object to enter the area between the illumination device 100 and the illuminated surface Ob, in this case the patient on the operating table. This object can, in particular, be a part of the body of a treating doctor or a medical instrument. The object causes shading. As a rule, the shading object enters the respective light cone of at least one light source, so that the maximum total illuminance in some areas of the total light field obtained is reduced. FIG. 11, FIG. 12 and FIG. 13 show three examples of the positioning of a shading object AO from the viewing direction of FIG. 1. The shading object AO is only shown schematically. In reality, a shading object is often larger than the one shown here.

Because the illumination device 100 has many (here: 66) different light sources and because the light axes of these light sources are not all arranged parallel to each other, such shading does not generally cause a sharp shadow to be formed (cast) on the illuminated surface Ob or even a previously illuminated area of the surface Ob to no longer be illuminated at all. Nevertheless, the shading is undesirable. The control unit 10 automatically effects that the shading is at least partially compensated for. How this objective is achieved is described below.

The control unit 10 receives signals from the distance meters dm, dm.2, . . . , dm.6 and evaluates these signals. In the following, the term "the signal from the distance measuring arrangement" is used for short. The control unit 10 automatically determines which light sources of the illumination device 100 are shaded. For this purpose, the assumption is used that a shading object AO scatters the incident electromagnetic radiation and thus light in the visible range and does not transmit it. Therefore, the shading object AO causes the measured distance between at least one distance meter dm, dm.2, . . . , dm.6 and the light-scattering surface to decrease, usually abruptly.

In one embodiment, control unit 10 only takes into account values for the distance between a distance meter and a light-scattering object that lie within a predetermined range of values, this range of values being part of the interval between 0 m and the reference distance. For example, the reference distance is 1 m, and this range of values is the range between 0.2 m and 0.8 m. A shading object generally has a distance to the illumination device 100 that lies within this range of values, while both the operating table Ob and the patient on the operating table Ob generally have a greater distance.

Preferably, the control unit 10 repeatedly determines which light sources are currently shaded, for example with a predefined constant sampling frequency. Of course, it is possible that no light source is currently shaded.

Preferably, the control unit 10 determines at least approximately the contour of a shading object AO and the position of this contour in a plane that is perpendicular to the optical center axis MA. This plane preferably has the reference distance to the illumination device 100. The determined contour approximately determines which area of the illuminated surface is shaded by the object AO, i.e. the shading area. It is possible that this contour is approximately described by a rectangle or a circle or another suitable geometric figure, whereby this geometric figure lies in a plane that is perpendicular to the optical center axis MA at the reference distance. To determine the contour, the control unit 10 uses the signal from the distance measuring arrangement. As already explained, each distance meter measures at least the distance between itself and the illuminated surface Ob or a light-scattering object AO. Optionally, the control unit 10 determines a topological profile of the illuminated surface. The shading object AO protrudes from the illuminated surface Ob, i.e. has a smaller distance to the illumination device 100 than the illuminated surface Ob.

As already mentioned above, in the embodiment example the control unit 10 has at least temporary read access to a data memory 11, in which

- for each light source, the respective maximum achievable individual illuminance, the position and orientation of the light axis relative to the center axis MA, the light divergence angle and the correlated color temperature, and
- for each distance meter dm, dm.2, . . . , dm.6 the position and orientation of the viewing direction (measuring direction) of this distance meter relative to the center axis MA are stored. From the measured distances and the information just described, which is stored in the data memory 11, the control unit 10 derives the information as to which light sources a.1, . . . , a.6, b.1, . . . , b.6, . . . are currently shaded. In one embodiment, a light source is assessed as being shaded when the object AO enters the light axis of this light source, in another embodiment when the object AO enters the light cone (light field diameter $d_{10}$) of this light source, see FIG. 2, FIG. 4 and FIG. 9.

As already explained, a user or even a higher-level control system can provide specifications for the illumination device 100, in particular specifications for the following parameters:

- the maximum entire illuminance,
- the light field diameter $d_x$, preferably $d_{10}$, and
- the correlated color temperature.

The control unit 10 automatically compensates for the shading with the objective of ensuring that the aforementioned parameters have the same value after compensation as before the shading. In many cases, this objective cannot be achieved, or at least not ideally. The control unit 10 therefore applies the following gradation (relative ranking/hierarchical relationship) among the objectives:

- The ultimate (primary) objective is that the maximum entire illuminance of the illumination device 100 remains the same. In addition, the point at which this maximum entire illuminance is achieved should remain the same. As a rule, this is the intersection point S.
- An objective of medium importance is that the light field diameter $d_x$ of the illumination device 100 also remains unchanged. The objective is at least that the light field diameter $d_x$ remains constant for x equal to 10%, optionally additionally for x=50% or another value for x.
- A lower priority objective may be that the light field of the illumination device 100 remains unchanged.
- An objective with even lower priority is that, in addition, the correlated color temperature of the illumination device 100 remains the same or at least a change is not perceptible to a human.

Note: In many cases, each light source has one of two possible correlated color temperatures, for example warm white and cool white. Cool white and warm white light sources are evenly distributed over the carrier 8. Therefore, in many cases, shading causes the correlated color temperature of the illumination device 100 not to change in a manner perceptible by a human. Therefore, the last objective is often achieved by itself once the first two objectives have been achieved, without the need for special control.

A boundary condition is that the compensation of the shading should take little computing time. More precisely: The compensation of the shading should be carried out within a period of time with a predetermined maximum duration. Furthermore, the compensation should preferably require relatively little computing power so that a relatively simple chip or processor can be used. The control unit 10 performs the compensation of the shading repeatedly, for example at the sampling frequency just mentioned.

Preferably, the control unit 10 causes a shaded light source to be switched off and to remain switched off for as long as the light source is shaded. This configuration saves energy and heat input into an illuminated object, in particular into a shaded object, and also saves computing time compared to a configuration in which a shaded light source remains switched on with reduced individual illuminance.

In the embodiment example, the maximum total illuminance, the light field diameter $d_x$ and the correlated entire color temperature of the illumination device 100 are not measured, but calculated by the control unit 10. As already mentioned, the maximum total illuminance, the light field diameter $d_x$ and the correlated entire color temperature of the illumination device 100 are produced by superimposing the light fields of the light sources—more precisely: those light sources that are currently switched on.

The control unit 10 determines the respective position and orientation of the light axis, the maximum achievable individual illuminance; the light field diameter $d_x$ and the correlated color temperature of each light source by means of read access to the above-mentioned data memory 11, whereby these parameters remain unchangeable in an implementation, as well as the current individual illuminance of each light source by means of read access to the data memory 12. The control unit 10 is able to change at least the respective current individual illuminance of each light source, for example to increase it up to the maximum achievable individual illuminance. In another implementation form, the control unit 10 is additionally able to control an actuator for a light source and thereby change the orientation of the light axis of this light source relative to the center axis MA.

The control unit 10 may have read access to a table in a form that can be evaluated by a computer. This table contains an entry for each possible shading of light sources of the illumination device 100 and a resulting control intervention that compensates for this shading and complies with the above-mentioned objectives. With N light sources, however, this table would theoretically have to have 2^N different entries so that there is a suitable entry for every possible shading. With 66 light sources, this would be 7*10^19 entries. In many cases, such a large table cannot be evaluated quickly enough. The control unit 10 therefore uses shortcut heuristics.

The terms "redundant" and "partially redundant" are used below, both for individual light sources and for position groups.

Two light sources are redundant to each other if they generate the same light field on an illuminated surface Ob—except for a tolerance. This surface Ob is perpendicular to the center axis MA of the illumination device 100 and is located at a reference distance from the illumination device 100. Two position groups are redundant to each other if their light sources together generate the same light field and there is a redundant light source of the other position group for each light source of one position group. In the example in FIG. 5, the two position groups Pos.2 and Pos.5 are redundant to each other.

Two light sources are partially redundant if their light fields overlap but the light fields are not identical and/or the light sources have different correlated color temperatures. In particular, the light fields can differ in terms of geometry and/or maximum individual illuminance and/or light field diameter. Accordingly, two position groups are partially redundant to each other if they generate the same light field on the illuminated surface and there is at least one partially redundant light source of the other position group for each light source of one position group, but no redundant light source.

The control unit 10 first attempts to replace each shaded light source with a non-shaded light source, whereby the replacement light source is redundant to the shaded light source. If n light sources are shaded, this procedure requires at least n unshaded and redundant light sources for compensation. A light source y is redundant to a light source x if the light axes $LA_x$ and $LA_y$ of the two light sources intersect the illuminated surface Ob at the same point, have the same light field $Lf_x$ and $Lf_y$ and therefore the same light field diameter and the same correlated color temperature. Note: In the embodiment example, a partially shaded light source is switched off until the shading is removed again.

The control unit 10 uses the information as to which light source belongs to which position group. For each light source x.4 of position group Pos.4 there is a redundant light source a.1, . . . , f.1 of position group Pos.1, see FIG. 2 and FIG. 3. So if a light source of position group Pos.4 is shaded, the control unit 10 determines the unshaded light sources of position group Pos.1 and vice versa. Only in position group Pos.1, but not in the other position groups, there is no light source that is redundant to a shaded light source in position group Pos.4. If the light sources of the two position groups Pos.2 and Pos.5 are configured as shown in FIG. 5, there is a redundant light source of position group Pos.5 for each light source of position group Pos.2 and vice versa.

The control unit 10 is able to control the m redundant light sources y.1, . . . , y.m in such a way that the m controlled light sources y.1, . . . , y.m together achieve a greater maximum individual illuminance than before. However, this step only compensates for the shading of light source x if the sum of the increased current maximum individual illuminances of the m light sources y.1, . . . , y.m is as large as the sum of the current maximum individual illuminances of the m+1 light sources x and y.1, . . . , y.m before the shading. This is often not possible, especially if several light sources are shaded at the same time and/or if some of the m unshaded redundant light sources y.1, . . . , y.m already achieved the maximum achievable individual illuminance before shading and their individual illuminance can therefore not be increased further. The individual illuminance that a light source can achieve is limited in particular by the maximum current that may flow through this light source.

If a shaded (shadowed) light source cannot be compensated or cannot be fully compensated by at least one redundant and unshaded (unshadowed) light source, the control unit 10 searches for at least one other light source using the following step-by-step procedure in order to compensate for the shading and thereby comply with the three objectives mentioned above with the priority specified there. If one step leads to complete or at least sufficient compensation of the shading, the next step is not carried out.

As a first step, the control unit 10 searches for light sources that are partially redundant to a shaded light source.

Two different position groups are partially redundant if they generate the same light field together, but not every light source in one position group is redundant to a light source in the other position group. Examples of redundant and only partially redundant light sources are shown in FIG. 6 and FIG. 7. Although the two position groups Pos.2 and Pos.5 generate the same light field, see FIG. 8, there is no redundant light source of position group Pos.5 for a light source of position group Pos.2 and vice versa.

If, in the situation shown in FIG. 6 and FIG. 7, a light source of position group Pos.2 is shaded, the control unit 10 searches for those light sources of position groups Pos.2 or Pos.5 that are partially redundant to the shaded light source and are not themselves shaded. If, for example, the light source a.2 is shaded, the control unit 10 determines the two light sources b.2 and f.2 of the position group Pos.2 and the two light sources a.5 and b.5 of the position group Pos.5. The control unit 10 searches for at least one light source that is not itself shaded and is not yet operated at the maximum individual illuminance. If the control unit 10 detects such a light source, the control unit 10 causes the maximum individual illuminance of this light source to be increased to the maximum achievable individual illuminance. If the control unit 10 detects several such light sources, the individual illuminance levels of all these light sources are preferably increased.

The second step is carried out if the previous steps have not led to sufficient compensation of the shading. In the second step, the control unit 10 searches for each light source y that cumulatively fulfills the following properties:

The light source y belongs to the same position group as the shaded light source x.

The light source y is not shaded.

The light source y is currently not operated at the maximum achievable individual illuminance.

If this condition is met, the control unit 10 causes the maximum individual illuminance of the light source y to be increased, preferably up to the maximum achievable individual illuminance.

If this also does not lead to sufficient compensation of the shading, the control unit 10 performs a third step and searches in the third step for each light source y that cumulatively fulfills the following properties:

The light source y belongs to a position group that is partially redundant to the position group of the shaded light source x.

The light source y is not shaded.

The light source y is currently not operated at the maximum achievable individual illuminance.

Again, the control unit 10 causes the maximum individual illuminance of this light source y to be increased.

If the third step also does not lead to sufficient compensation of the shading, the control unit 10 selects light sources that are currently not shaded and belong to a further position group, for example to a position group that is adjacent to the position group of a shaded light source. The control unit 10 causes the maximum individual illuminance of at least one selected light source to be increased.

While specific embodiments of the invention have been shown and described in detail to illustrate the application of the principles of the invention, it will be understood that the invention may be embodied otherwise without departing from such principles.

| List of reference characters | |
|---|---|
| 5 | Handle on the carrier 8, enables the illumination device 100 to be moved and oriented in the room |
| 8 | Carrier (support) of the illumination device 100, carries the light sources a.1, . . . , a.6, b.1, . . . , b.6, . . . , the handle 5 and the distance meters dm, dm.2, . . . , dm.6 |
| 10 | Signal-processing control unit, receives signals from the distance meters dm, dm.2, . . . , dm.6, uses these signals as the signal of the distance measuring arrangement, controls the light sources a.1, . . . , a.6, b.1, . . . , b.6, . . . of the illumination device 100, has at least temporary read access to the data memories 11 and 12 and write access to the data memory 12 |
| 11 | Data memory in which unchangeable information about the light sources a.1, . . . , a.6, b.1, . . . , b.6, . . . is stored |
| 12 | Data memory in which changeable information about the light sources a.1, . . . , a.6, b.1, . . . , b.6, . . . is stored |
| 20 | Input unit that allows a user to change the maximum entire illuminance, the light field diameter, and the correlated color temperature |
| 100 | Illumination device (lighting device), comprises the light sources a.1, . . . , a.6, b.1, . . . , b.6, . . . , the carrier 8, the handle 5, the input unit 20, the control unit 10 and the distance meters dm, dm.2, . . . , dm.6, is rotationally symmetrical to the optical center axis MA |
| a.1, . . . , a.6, b.1, . . . , b.6, . . . | Individual light sources of the illumination device 100 |
| AO | Shading (shadowing) object |
| Bg.a, . . . , Bg.f | Assemblies of the illumination device 100, each comprise eleven light sources a.1, . . . , a.6, b.1, . . . , b.6, . . . |
| dm | Central distance meter, measures the distance between the illumination device 100 and the illuminated object along the center axis MA |
| dm.x | Distance meter of the position group Pos.x (x = 2, . . . , 6) |
| $LA_{a.4}$ | Optical light axis of the light source a.4 |
| $LA_{d.2}$ | Optical light axis of the light source d.2 |
| $Lf_1$ | Light field generated by the light sources of position group Pos. 1 together |
| $Lf_2$ | Light field generated by the light sources of position group Pos. 2 together |

-continued

| List of reference characters | |
|---|---|
| $Lf_{a.4}$ | Circular light field of the light source a.4 on the illuminated surface Ob |
| $Lf_{d.2}$ | Circular light field of the light source d.2 on the illuminated surface Ob |
| $Lk_{a.4}$ | Light cone of the light source a.4 |
| $Lk_{d.2}$ | Light cone of the light source d.2 |
| MA | Optical center axis of the illumination device 100 |
| Ob | Surface of the object facing the illumination device 100 and therefore illuminated Object Obj |
| Obj | Illuminated object, in this case: patient on the operating table, whose surface Ob facing the illumination device 100 is illuminated by the illumination device 100 |
| Pos.1 | Position group of the illumination device 100, comprises the light sources a.1, b.1, . . . , f.1 |
| Pos.2, . . . , Pos.6 | Further position groups of the illumination device 100, comprises the light sources a.2, . . . , f.2 or a.3, . . . , f.3 or . . . and in each case at least one distance meter dm.2 or dm.3 or . . . |
| r | Coinciding distance (uniform distance) on the illuminated surface between the center axis MA on the one hand and the light axes of the light sources of the position groups Pos.2 and Pos.5 on the other hand |
| $r_1$ | Distance on the illuminated surface Ob between the center axis MA on the one hand and the light axes $LA_{a.3}$ and $LA_{d.3}$ of the light sources of position group Pos. 3 on the other hand |
| $r_2$ | Distance on the illuminated surface Ob between the center axis MA on the one hand and the light axes $LA_{a.6}$ and $LA_{d.6}$ of the light sources of position group Pos. 6 on the other hand |
| S | Intersection of the optical center axis MA with the illuminated surface Ob |
| S.1 | Common intersection of the optical light axes $LA_{a.5}$ and $LA_{a.2}$ with the illuminated surface Ob |
| S.2 | Common intersection of the optical light axes $LA_{d.5}$ and $LA_{d.2}$ with the illuminated surface Ob |
| S.3 | intersection of the optical light axis $LA_{a.6}$ with the illuminated surface Ob |
| S.4 | intersection of the optical light axis $LA_{d.6}$ with the illuminated surface Ob |
| S.5 | intersection of the optical light axis $LA_{a.3}$ with the illuminated surface Ob |
| S.6 | intersection of the optical light axis $LA_{d.3}$ with the illuminated surface Ob |

What is claimed is:

1. An illumination device for illuminating a surface, the illumination device comprising:

a light source set comprising several light sources;

a distance measuring arrangement comprising several spaced-apart distance meters; and a signal-processing control unit, wherein the illumination device has an optical center axis and is configured to achieve a maximum total illuminance on the illuminated surface in a maximum area, wherein each of the light sources of the light source set has a respective light axis and is configured to generate a respective light field on the illuminated surface, wherein the light source has a maximum achievable individual illuminance of the generated light field, wherein the maximum individual illuminance of each of the light sources of the light source set can be set independently of the respective maximum individual illuminance of the or each of the other light sources to a value which lies between zero and the maximum achievable individual illuminance of this light source, wherein the control unit is configured to capture respective predetermined information for each light source of the light source set, wherein the captured or capturable information includes the respective maximum achievable individual illuminance of each light source and the respective position and/or orientation of the light axis of each light source relative to the optical center axis of the illumination device, wherein each distance meter of the distance measuring arrangement has a respective measuring direction pointing towards the illuminated surface and is configured to measure a respective distance between itself and a light-scattering object, wherein the control unit is configured to set the respective current individual illuminance of each light source of the set of light sources to a value, wherein the control unit is further configured to capture an illuminance specification that specifies a target value for the maximum total illuminance which the illumination device should generate, wherein the control unit is further configured, depending on a signal from the distance measuring arrangement, to determine whether a shading event has occurred, the shading event comprising an event during which at least one object is located between the illumination device and the illuminated surface, after determining that a shading event has occurred, to determine a shading area, which shading area includes an area on the illuminated surface which is completely or at least partially shaded by the object, and to search, depending on the determined shading area, for at least one light source of the light source set suitable for shading compensation, wherein a light source suitable for shading compensation is a light source: that is currently being operated with a value for the maximum individual illuminance that is lower than the maximum achievable individual illuminance of the light source; that is not shaded at all or at least not completely shaded; and that has its light axis intersecting the illuminated surface in the determined shading area, wherein the control unit is further configured to compensate for shading when at least one light source suitable for shading compensation is found, wherein the control unit is further configured, depending on the captured illuminance specification and depending on the captured information about the light sources of the light source set, to determine a subset with at least one suitable light source and to calculate for each light source of the selected subset a respective target value for the maximum individual illuminance, wherein the target value for each light source in the determined subset is greater than a current value of the maximum individual illuminance of this light source, and wherein the control unit is further configured to effect that this light source actually achieves the calculated target value for the maximum individual illuminance, wherein two objectives in calculating the target values for the maximum individual illuminances of the light sources of the subset are that the position of the maximum area relative to the optical center axis remains unchanged and the actual value of the maximum total illuminance that the illumination device currently achieves in the maximum area is equal to the captured illuminance specification.

2. The illumination device according to claim 1, wherein the captured or capturable information about the light sources further comprises, for each light source of the set of light sources, a respective light field diameter of the light field generated by that light source, wherein the control unit is further configured to additionally capture a light field diameter specification which specifies a target value for the entire light field diameter which the light field generated by the illumination device should have, and wherein the control unit is further configured to calculate the target values for the current maximum individual illuminance levels of the light sources of the subset with the further objective that the actual value of the entire light field diameter of the light field achieved by the illumination device is equal to the captured light field diameter specification.

3. The illumination device according to claim 2, wherein the control unit is configured to, after capturing of an illuminance specification and a light field diameter specification, calculate, for each light source of the light source set, an initial target for the current maximum individual illuminance of the light source and to effect that the respective actual value of the maximum individual illuminance achieved by a light source of the light source set is equal to the calculated initial target value for this light source, where the initial target is used at least as long as no shading event is detected and no further illuminance specification is captured, wherein the control unit is further configured to perform at least one increasing sequence after a shading event has been detected and a suitable light source has been found, wherein the or each increasing sequence comprises the steps that the control unit determines a subset of the light source set with at least one light source suitable for shading compensation, calculates a target value for the maximum individual illuminance of the light source or each light source of the determined subset, the target value being greater than the current maximum individual illuminance, and effects the respective current maximum individual illuminance of the or each light source of the determined subset to be increased to the calculated target value.

4. The illumination device according to claim 3, wherein the control unit is also configured, when performing an increasing sequence, after the steps of determining the subset, calculating the respective target values, and increasing the respective maximum individual illuminance, to check by calculation whether the position of the maximum area relative to the optical center axis has changed sufficiently little despite the shading event and whether the actual current value of the maximum total illuminance of the illumination device now corresponds sufficiently accurately to the captured illuminance specification, and if the actual current value of the maximum total illuminance of the illumination device does not yet correspond sufficiently accurately to the captured illuminance specification, either to re-determine a subset and to calculate a target value for the maximum individual illuminance of each light source of this determined subset or to determine that the deviation between the illuminance specification and the current value of the maximum total illuminance of the illumination device and the deviation between the light field diameter specification and the current value of the light field diameter cannot be further reduced.

5. The illumination device according to claim 1, wherein the control unit is configured, after capturing of an illuminance specification, to calculate, for each light source of the light source set, a respective initial target value for the current maximum individual illuminance of this light source and to effect that the respective current value of the maximum individual illuminance achieved by a light source of the light source set is equal to the calculated initial target value for this light source, where the initial target value is used at least as long as no shading event is detected and no further illuminance specification is captured, wherein the control unit is further configured to perform at least one increasing sequence after a shading event has been detected and a suitable light source has been found, wherein the or each increasing sequence comprises the steps that the control unit determines a subset of the light source set with at least one light source suitable for shading compensation, calculates a target value for the maximum individual illuminance of the light source or each light source of the determined subset, the target value being greater than the current maximum individual illuminance, and effects the respective current maximum individual illuminance of the or each light source of the determined subset to be increased to the calculated target value.

6. The illumination device according to claim 5, wherein the control unit is also configured, when performing an increasing sequence, after the steps of determining the subset, calculating the respective target values, and increasing the respective individual illuminance, to check by calculation whether the position of the maximum area relative to the optical center axis has changed sufficiently little despite the shading event and whether the actual current value of the maximum total illuminance of the illumination device now corresponds sufficiently accurately to the captured illuminance specification, and if the actual current value of the maximum total illuminance of the illumination device does not yet correspond sufficiently accurately to the captured illuminance specification, either to re-determine a subset and to calculate a target value for the maximum individual illuminance of each light source of this determined subset or to determine that the deviation between the illuminance specification and the current value of the maximum total illuminance of the illumination device cannot be further reduced.

7. The illumination device according to claim 1, wherein the control unit is configured to detect, after the detection of the shading event, at least one light source of the set of light sources which is completely or at least partially shaded and wherein the control unit is further configured, when searching for a light source suitable for shading compensation, to search, by using captured or capturable information about the light sources of the light source set, for at least one light source that fulfills at least one predefined compensation criterion with respect to the or at least one shaded light source, if at least one light source fulfilling the compensation criterion or at least one compensation criterion is found, to check which of the light sources found by using the compensation criterion are suitable for shading compensation, and if at least one light source fulfills the compensation criterion and is suitable, to determine and use as the subset a set consisting of light sources that fulfill the compensation criterion or at least one compensation criterion and are suitable for shading compensation.

8. The illumination device according to claim 7, wherein the light source set of the illumination device comprises at least one first light source and at least another light source which are redundant to the first light source, and/or at least one second light source and at least another light source that are partially redundant with the second light source, wherein a further light source is redundant to the first light source if the two intersection points of the two light axes of the two light sources with an illuminated flat surface are spaced apart from each other by no more than a specified tolerance, and the two light fields generated by these two light sources do not deviate from each other by more than a specified tolerance, wherein a further light source is partially redundant to the second light source if the two intersection points of the two light axes of the two light sources with an illuminated flat surface are not spaced apart from each other by more than a specified tolerance, or the two light fields generated by these two light sources do not deviate from each other by more than a specified tolerance, or the intersection point of the light axis of one light source lies in a diameter ($d_x$) circle around the intersection point of the light axis of the other light source, where x of $d_x$ is a specified percentage, wherein, for each light source of the light source set, the captured or capturable information comprises information which other light source or which other light sources of the light source set are redundant to this light source and/or which are partially redundant, and wherein the control unit is configured to use as the compensation criterion or as a compensation criterion the criterion that a further light source is redundant to and/or partially redundant with the or a shaded light source.

9. The illumination device according to claim 8, wherein the light source set of the illumination device comprises both the first light source and the first other light source which are redundant to the first light source, and the second light source and the second other light source that are partially redundant with the second light source, wherein the control unit is configured to perform a first increasing sequence that comprises the steps of searching for each shaded light source at least one other light source suitable for shading compensation, which other light source is redundant to and/or partially redundant with the shaded light source and also fulfills at least one predetermined additional criterion, and if at least one redundant suitable light source is found, to increase the actual value of the maximum individual illuminance of the or at least one redundant suitable light source, wherein the control unit is configured to check whether, based on the increase performed during the first increasing sequence, the value of the actual maximum total illuminance of the illumination device corresponds sufficiently to the captured illuminance specification, and if not, to carry out a second increasing sequence, wherein the second increasing sequence comprises the steps of searching for each shaded light source another light source suitable for shading compensation, which another light source is redundant to and/or partially redundant with the shaded light source and does not fulfill the or at least one specified additional criterion, and if at least one partially redundant suitable light source is found, to increase the actual value of the maximum individual illuminance of the or at least one partially redundant and non-redundant suitable light source.

10. The illumination device according to claim 9, wherein the additional criterion applied in the first increasing sequence is fulfilled if the other light source is redundant to the shaded light source.

11. The illumination device according to claim 9, wherein the light sources of the light source set are subdivided into at least two light source groups such that each light source of the light source set belongs to exactly one light source group, and wherein the additional criterion applied in the first increasing sequence is fulfilled when the other light source and the shaded light source belong to the same light source group and/or the other light source belongs to a predefined light source group.

12. The illumination device according to claim 9, wherein the control unit is configured to check whether, after the second increasing sequence, the position of the maximum area relative to the optical center axis has changed sufficiently little despite the shading event and the current maximum total illuminance of the illumination device corresponds sufficiently accurately to the captured illuminance specification, and if not, to select at least one further light source of the light source set suitable for shading compensation and to cause the maximum individual illuminance of the selected the further light source to be increased.

13. The illumination device according to claim 9, wherein the light sources of the light source set are subdivided into at least two light source groups such that each light source of the light source set belongs to exactly one light source group, wherein the light sources of a light source group together generate a light field, at least in the absence of a shading event on the illuminated surface, having a maximum illuminance that occurs at the intersection point of the optical center axis with the illuminated surface or that occurs in a circle around this intersection point, wherein for each light source of the light source set the captured or capturable information about the light sources comprises the information which light source of the light source set belongs to which light source group, and wherein the control unit is configured to use the criterion as the compensation criterion or a compensation criterion, that another light source belongs to the same light source group as the shaded light source or a shaded light source.

14. The illumination device according to claim 9, wherein each light source of the illumination device has a correlated color temperature and the light sources of the set of light sources have a total of at least two different color temperatures, wherein for each light source of the set of light sources the captured or capturable information comprises the correlated color temperature of this light source, and wherein the control unit is configured to use as the or a compensation criterion the criterion that a further light source has the same color temperature as the or a shaded light source.

15. The illumination device according to claim 1, wherein the control unit is configured to detect an event that at least one light source of the light source set has failed, and compensate for the failure of the or each failed light source by means of shading compensation.

16. An illumination process for illuminating a surface, the process comprises:

providing an illumination device that comprises: a light source set with several light sources; a distance measuring arrangement with several spaced-apart distance meters; and a signal-processing control unit, wherein the illumination device has an optical center axis, wherein each light source of the light source set respectively has a respective light axis and is configured to generate a respective light field on the illuminated surface wherein the light source has a maximum achievable individual illuminance of the generated light field, wherein a current maximum individual illuminance of a light source of the light source set can be set independently of a current maximum individual illuminance of each other light source to a value which lies between zero and a maximum achievable individual illuminance of the respective light source, wherein each distance meter of the distance measuring arrangement has a respective measuring direction pointing towards the illuminated surface;

with the control unit, capturing predetermined information for each light source of the light source set, wherein the captured information includes a maximum achievable individual illuminance which the respective light source can generate and the respective position and/or orientation of the respective light axis of the light source relative to the optical center axis of the illumination device, with the control unit, capturing an illuminance specification, wherein the captured illuminance specification specifies a target value for the maximum total illuminance which the illumination device is to generate;

with the control unit, setting at least once, preferably repeatedly, the respective current maximum individual illuminance of each light source of the light source set to a value wherein the illumination device achieves the maximum total illuminance on the illuminated surface in a maximum area;

with each distance meter of the distance measuring arrangement, measuring a distance between the respective distance meter and a light-scattering object;

with the control unit, determining whether a shading event has occurred, the shading event comprising an event that at least one object is located between the illumination device and the illuminated surface and a signal from the distance measuring arrangement is used for the determination;

after the detection of a shading event, with the control unit determining a shading area, which shading area includes an area on the illuminated surface that is completely or at least partially shaded by the object;

depending on the determined shading area, with the control unit searching for at least one light source of the light source set suitable for shading compensation, wherein a light source suitable for shading compensation is a light source of the light source set that is currently being operated with a value for the maximum individual illuminance that is lower than the maximum achievable individual illuminance of the light source, that is not shaded at all or at least not completely shaded, and that has a light axis that intersects the illuminated surface in the determined shading area, and if one or more suitable light source of the light source set are found, with the control unit determining a subset with the one or more suitable light sources and calculating for each light source of the determined subset a respective target value for the maximum individual illuminance of the light source wherein the target value is greater than the current value of the maximum individual illuminance of this light source, and to effect that the suitable light source actually achieves the calculated target value for the maximum individual illuminance; and wherein calculating the target values for the maximum individual illuminances of the light sources in the subset is performed with the objectives that a position of the maximum area relative to the optical center axis remains unchanged and the actual value of the maximum total illuminance currently achieved by the illumination device is equal to the captured illuminance specification.

* * * * *